US009852546B2

(12) United States Patent
Kraver et al.

(10) Patent No.: US 9,852,546 B2
(45) Date of Patent: Dec. 26, 2017

(54) METHOD AND SYSTEM FOR RECEIVING GESTURE INPUT VIA VIRTUAL CONTROL OBJECTS

(71) Applicant: CCP hf., Reykjavik (IS)

(72) Inventors: Adam Kraver, Tucker, GA (US); Joel Patrick McGinnis, Decatur, GA (US); John Warren Rittenhouse, Avondale Estates, GA (US)

(73) Assignee: CCP HF., Reykjavik (IS)

( * ) Notice: Subject to any disclaimer, the term of this patent is extended or adjusted under 35 U.S.C. 154(b) by 0 days.

(21) Appl. No.: 14/608,047

(22) Filed: Jan. 28, 2015

(65) Prior Publication Data

US 2016/0217614 A1 Jul. 28, 2016

(51) Int. Cl.
*G09G 5/00* (2006.01)
*G06T 19/00* (2011.01)
*G06F 3/01* (2006.01)
*G02B 27/01* (2006.01)
*G06F 3/00* (2006.01)

(52) U.S. Cl.
CPC .......... *G06T 19/006* (2013.01); *G02B 27/017* (2013.01); *G06F 3/005* (2013.01); *G06F 3/011* (2013.01); *G06F 3/012* (2013.01); *G06F 3/017* (2013.01)

(58) Field of Classification Search
None
See application file for complete search history.

(56) References Cited

U.S. PATENT DOCUMENTS

| 6,032,193 | A | 2/2000 | Sullivan |
| 6,181,343 | B1 | 1/2001 | Lyons |
| 7,301,536 | B2 | 11/2007 | Ellenby et al. |
| 7,814,154 | B1 | 10/2010 | Kandekar et al. |

(Continued)

OTHER PUBLICATIONS

LaViola, Jr. J. J., *Brining VR and Spatial 3D Interaction to the Masses Through Video Games,* Graphically Speaking, IEEE Computer Society (Sep.-Oct. 2008) 10-15.

(Continued)

*Primary Examiner* — Xiao Wu
*Assistant Examiner* — Mohammad H Akhavannik
(74) *Attorney, Agent, or Firm* — Alston & Bird LLP

(57) ABSTRACT

Aspects of the present invention provide computer systems, apparatuses, computer-executable methods and one or more non-transitory computer-readable media for receiving gesture input via virtual controls. Examples include a computer-implemented method that includes receiving data indicating a physical environment state, processing the data to determine a physical position of at least one user, determining at least one physical anchor position within the physical environment state, mapping the physical anchor position to a virtual anchor position within a virtual environment state, wherein the virtual environment state includes a plurality of virtual coordinate positions that map to at least a portion of the physical environment state, determining a particular virtual coordinate position for at least one virtual control from the plurality of virtual coordinate positions, and instructing a display device configured to display the virtual environment state to display the virtual control at the particular virtual coordinate position.

25 Claims, 15 Drawing Sheets

(56) References Cited

U.S. PATENT DOCUMENTS

| | | |
|---|---|---|
| 7,864,168 B2 | 1/2011 | French |
| 8,576,276 B2 | 11/2013 | Bar-Zeev et al. |
| 8,585,476 B2 | 11/2013 | Mullen |
| 8,687,021 B2 | 4/2014 | Bathiche et al. |
| 8,713,450 B2 | 4/2014 | Garbow et al. |
| 8,933,876 B2 | 1/2015 | Galor et al. |
| 2003/0032484 A1 | 2/2003 | Ohshima et al. |
| 2006/0087509 A1 | 4/2006 | Ebert et al. |
| 2007/0110298 A1 | 5/2007 | Graepel et al. |
| 2008/0201751 A1 | 8/2008 | Ahmed et al. |
| 2009/0016255 A1 | 1/2009 | Park |
| 2009/0141023 A1 | 6/2009 | Shuster |
| 2009/0225074 A1 | 9/2009 | Bates et al. |
| 2010/0161859 A1 | 6/2010 | Brandt et al. |
| 2010/0309097 A1 | 12/2010 | Raviv et al. |
| 2011/0238794 A1 | 9/2011 | Wu et al. |
| 2012/0105473 A1 | 5/2012 | Bar-Zeev et al. |
| 2012/0122570 A1 | 5/2012 | Baronoff |
| 2012/0206452 A1 | 8/2012 | Geisner et al. |
| 2012/0249416 A1 | 10/2012 | Maciocci et al. |
| 2012/0264510 A1 | 10/2012 | Wigdor et al. |
| 2013/0117377 A1 | 5/2013 | Miller |
| 2013/0121563 A1 | 5/2013 | Chen et al. |
| 2013/0125027 A1 | 5/2013 | Abovitz |
| 2013/0141419 A1 | 6/2013 | Mount et al. |
| 2013/0162639 A1 | 6/2013 | Muench et al. |
| 2013/0257904 A1 | 10/2013 | Roth |
| 2014/0078176 A1 | 3/2014 | Kim et al. |
| 2014/0128161 A1 | 5/2014 | Latta et al. |
| 2014/0160162 A1 | 6/2014 | Balachandreswaran et al. |
| 2014/0204002 A1 | 7/2014 | Bennet et al. |
| 2015/0016777 A1 | 1/2015 | Abovitz et al. |
| 2015/0352437 A1* | 12/2015 | Koseki .................. A63F 13/212 463/31 |
| 2016/0345871 A1 | 12/2016 | Matsumoto et al. |

OTHER PUBLICATIONS

Adobbati, R. et al., *Gamebots: A 3D Virtual World Test-Bed for Multi-Agent Research*, Agents '01, ACM (2001) 6 pages.

Di Bias, N. et al., *The SEE Experience: Edutainment in 3D Virtual Worlds*, ERIC, IR 058 816, ED 482 149, Papers Museum & The Web 2003 (2003) 14 pages.

Kato, H. et al., *Virtual Object Manipulation on a Table-Top AR Environment*, Proceedings of the International Symposium on Augmented Reality (ISAR 2000) 9 pages.

Ohshima, T. et al., $AR^2$ *Hockey: A Case Study of Collaborative Augmented Reality*, Proc. IEEE Virtual Reality Annual International Symposium (VRAIS'98) (Mar. 1998) 268-275, 8 pages.

Piekarski, W. et al., *ARQuake: The Outdoor Augmented Reality Gaming System*, Communications of the ACM, vol. 45, No. 1 (Jan. 2002) 36-38.

Szalavari, Z. et al., *Collaborative Gaming in Augmented Reality*, ACM Symposium on Virtual Reality Software and Technology (1998) 1-19.

Widder, B., *Best Augmented Reality Appl* [online] [retrieved Sep. 26, 2014]. Retrieved from the Internet: <URL: http://www.digitaltrends.com/mobile/best-augmented-reality-apps/>. (dated Mar. 14, 2014) 5 pages.

U.S. Appl. No. 14/608,054, filed Jan. 28, 2015; In re: Kraver, entitled *Method and System for Implementing a Multi-User Virtual Environment*.

U.S. Appl. No. 14/608,067, filed Jan. 28, 2015; In re: Kraver, entitled *Method and System for Providing Virtual Display of a Physical Environment*.

Villar, Jacobo Rodriguez. "OpenGL Shading Language Course: Chapter 1—Introduction to GLSL." TyphoonLabs, TyphoonLabs' GLSL Course, 2004, 29 pages.

Non-Final Office Action for U.S. Appl. No. 14/608,054, dated Feb. 17, 2016.

Non-Final Office Action for U.S. Appl. No. 14/608,067, dated Apr. 20, 2016.

International Search Report and Written Opinion for International Patent Application No. PCT/IB2016/050408 dated Apr. 11, 2016, 14 pages.

International Search Report and Written Opinion for International Patent Application No. PCT/IB2016/050410 dated Apr. 20, 2016, 14 pages.

International Search Report and Written Opinion for International Patent Application No. PCT/IB2016/050411 dated May 2, 2016, 14 pages.

Office Action for U.S. Appl. No. 14/608,054 dated May 25, 2017.
Office Action for U.S. Appl. No. 14/608,067 dated May 9, 2017.
Final Office Action for U.S. Appl. No. 14/608,054 dated Sep. 2, 2016, 67 pages.
Final Office Action for U.S. Appl. No. 14/608,067 dated Sep. 14, 2016, 31 pages.

* cited by examiner

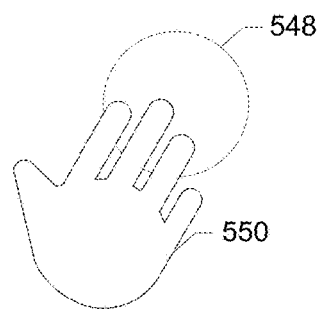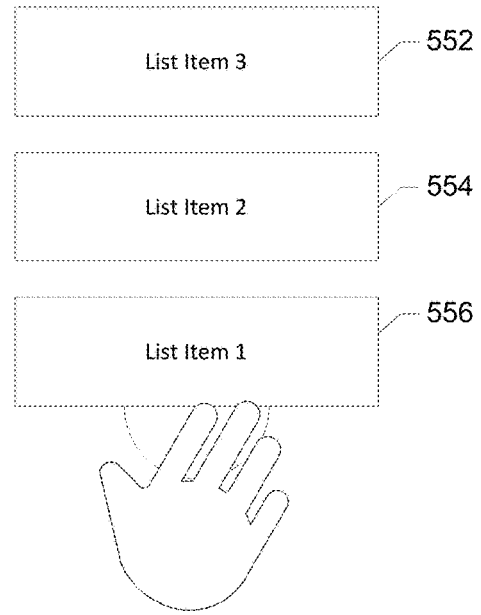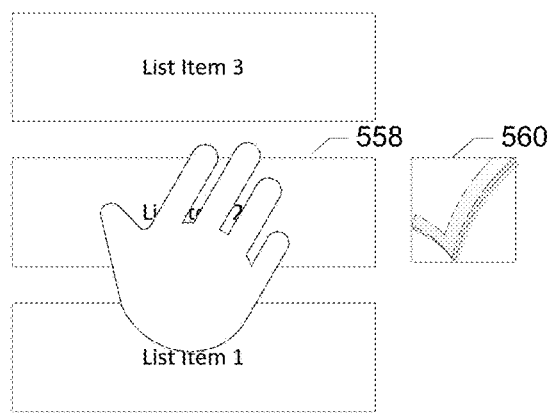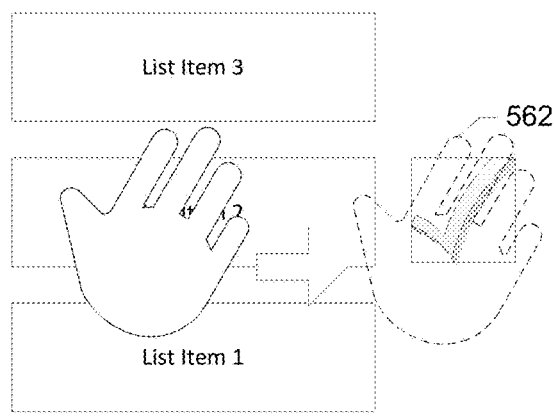
FIG 5H
FIG 5I
FIG 5J
FIG 5K

METHOD AND SYSTEM FOR RECEIVING GESTURE INPUT VIA VIRTUAL CONTROL OBJECTS

TECHNOLOGICAL FIELD

Example embodiments of the present invention relate generally to input methods for a virtual reality interface and, more particularly, to methods, systems, apparatuses, and computer readable media for receiving gesture input via virtual control objects.

BACKGROUND

Advances in technology have resulted in consumer electronics becoming more and more powerful. In particular, advances in display, graphics, processor, and sensor technology have provided technological breakthroughs that have made it feasible to mass produce and market devices capable of providing a virtual reality (VR) experience to consumers. In this regard, problems and challenges in current implementations of VR interfaces have been identified by the inventors, and solutions to these problems and challenges are implemented in exemplary embodiments.

BRIEF SUMMARY

Various embodiments of the present invention are directed to improved apparatuses, methods, and computer readable media for providing a virtual reality interface. In accordance with one exemplary embodiment, a computer-executable method is provided for implementing a virtual control. The method includes receiving data indicating a physical environment state, processing, by a processor, the data indicating the physical environment state to determine a physical position of at least one user, determining, by the processor and based on the position of the at least one user, at least one physical anchor position within the physical environment state, mapping, by virtual environment state management circuitry, the physical anchor position to a virtual anchor position within a virtual environment state, wherein the virtual environment state includes a plurality of virtual coordinate positions that map to at least a portion of the physical environment state, and determining, by the virtual environment state management circuitry, a particular virtual coordinate position for at least one virtual control from the plurality of virtual coordinate positions. The particular virtual coordinate position is determined at least in part by identifying a virtual control positioning offset indicating a relative position with respect to the virtual anchor position, and applying the virtual control positioning offset to the virtual anchor position to determine the particular virtual coordinate position, wherein a first relative position between the particular virtual coordinate position and the virtual anchor position corresponds to a second relative position between a particular physical coordinate position mapped to the particular virtual coordinate position and the physical anchor position. The method also includes instructing a display device configured to display the virtual environment state to display the virtual control at the particular virtual coordinate position.

In some embodiments, the method may also include determining that the physical position of at least a portion of the user is within a defined area of a physical environment corresponding to the physical environment state that maps to the particular virtual coordinate position, and, in response to mapping the physical position of the at least one the user to the particular virtual coordinate position, executing functionality associated with the virtual control. The method may also include executing the functionality associated with the virtual control only in response to determining that the physical position of the at least one user has been proximate to the physical position that maps to the particular virtual coordinate position for at least a threshold period of time. The physical position of the at least one user may be the user's head or shoulders. The virtual control may be associated with one or more particular gestures, and functionality of the virtual control may only be executed in response to performing at least one of the one or more gestures at a physical position that maps to a defined area around the particular virtual coordinate position. The data may indicate the physical environment state is received from at least one sensor and wherein the at least one sensor is at least one of a camera or an infrared receiver. The display device may be a head-mounted display. The physical anchor position may be determined at least in part by detecting an infrared emitter mounted on the head-mounted display. The method may also include determining a view angle of the at least one user, and displaying the virtual control only in response to determining that the view angle corresponds to an area of a physical environment corresponding to the particular virtual coordinate position. The method may also include determining a view angle of the at least one user, and enabling interaction with the virtual control in response to determining that the view angle corresponds to an area of a physical environment corresponding to the particular virtual coordinate position of the virtual control object. The view angle of the user may be determined based at least in part on a sensor reading received from a head-mounted device. Determining the physical anchor position may be performed in response to at least one of turning on the display device or placing the display device on the user's head. A component value of the virtual control positioning offset may be determined based at least in part on a number of initialized virtual controls, or a detected height of the user.

According to another exemplary embodiment, a computer-implemented method is provided for implementing a virtual control in a virtual reality environment. The method includes receiving data indicating a physical environment state, processing, by a processor, the data indicating the physical environment state to determine a physical position of physical object, determining, by the processor, based on the physical position of the physical object, at least one virtual anchor position within a virtual environment state, determining, by virtual environment state management circuitry, a virtual control position of a virtual control in the virtual environment state relative to the virtual anchor position, mapping, by the virtual environment state management circuitry, the virtual control position to a physical position of the control in a physical environment corresponding to the physical environment state, and instructing a display device configured to display the virtual environment state to display the virtual environment state such that the virtual control is displayed at the virtual control position.

The method may also include determining that a view angle of the display device is angled toward the physical position prior to displaying the virtual control via the display device. In some embodiments, the method includes determining that the physical position of the physical object is within a defined area of a physical environment corresponding to the physical environment state that maps to the particular virtual coordinate position, and, in response to determining that the physical position of the user is proximate to the physical position of the control, executing functionality associated with the virtual control. The method may include executing the functionality associated with the virtual control only in response to determining that the physical position of physical object has been proximate to the physical position of the control for at least a threshold period of time. The virtual anchor position may be associated with a physical position of a user's head. The at least one sensor may be at least one of a camera or an infrared receiver. The display device may be a head-mounted display. Determining the virtual anchor position may be performed in response to at least one of turning on the display device or placing the display device on the user's head.

According to another exemplary embodiment, a non-transitory computer-readable storage medium is provided. The storage medium includes instructions, that, when executed by a processor, cause the processor to implement a virtual control in a virtual reality environment. The instructions cause the process to execute functionality for receiving data indicating a physical environment state, processing the data indicating the physical environment state to determine a physical position of at least one user, determining, based on the position of the at least one user, at least one physical anchor position within the physical environment state, mapping the physical anchor position to a virtual anchor position within a virtual environment state, wherein the virtual environment state includes a plurality of virtual coordinate positions that map to at least a portion of the physical environment state, and determining a particular virtual coordinate position for at least one virtual control from the plurality of virtual coordinate positions. The virtual coordinate position is determined by at least identifying a virtual control positioning offset indicating a relative position with respect to the virtual anchor position, and applying the virtual control positioning offset to the virtual anchor position to determine the particular virtual coordinate position, wherein a first relative position between the particular virtual coordinate position and the virtual anchor position corresponds to a second relative position between a particular physical coordinate position mapped to the particular virtual coordinate position and the physical anchor position. The instructions also configure the processor to for instructing a display device configured to display the virtual environment state to display the virtual control at the particular virtual coordinate position.

In some embodiments, the instructions also include determining that the physical position of at least a portion of the user is within a defined area of a physical environment corresponding to the physical environment state that maps to the particular virtual coordinate position, and in response to mapping the physical position of the at least one the user to the particular virtual coordinate position, executing functionality associated with the virtual control. The instructions may also configure the processor to execute the functionality associated with the virtual control only in response to determining that the physical position of the at least one user has been proximate to the physical position that maps to the particular virtual coordinate position for at least a threshold period of time. The physical position of the at least one user may be the user's head or shoulders.

The virtual control may be associated with one or more particular gestures, and wherein functionality of the virtual control may only be executed in response to performing at least one of the one or more gestures at a physical position that maps to a defined area around the particular virtual coordinate position. The data may indicate the physical environment state is received from at least one sensor and wherein the at least one sensor is at least one of a camera or an infrared receiver. The display device may be a head-mounted display. The physical anchor position may be determined at least in part by detecting an infrared emitter mounted on the head-mounted display. The instructions may also configure the processor for determining a view angle of the at least one user, and displaying the virtual control only in response to determining that the view angle corresponds to an area of a physical environment corresponding to the particular virtual coordinate position. The instructions may also configure the processor for determining a view angle of the at least one user, and enabling interaction with the virtual control in response to determining that the view angle corresponds to an area of a physical environment corresponding to the particular virtual coordinate position of the virtual control object. The view angle of the user may be determined based at least in part on a sensor reading received from a head-mounted device. The instructions may also configure the processor for determining a view angle of the at least one user, and enabling interaction with the virtual control in response to determining that the view angle corresponds to an area of a physical environment corresponding to the particular virtual coordinate position of the virtual control object. The view angle of the user may be determined based at least in part on a sensor reading received from a head-mounted device. Determining the physical anchor position may be performed in response to at least one of turning on the display device or placing the display device on the user's head. The value of the virtual control positioning offset may be determined based at least in part on a number of initialized virtual controls, or a detected height of the user.

According to another exemplary embodiment, another non-transitory computer-readable storage medium is provided. The storage medium includes instructions, that, when executed by a processor, cause the processor to implement a virtual control in a virtual reality environment. The instructions configure the processor for at least receiving data indicating a physical environment state, processing the data indicating the physical environment state to determine a physical position of physical object, determining based on the physical position of the physical object, at least one virtual anchor position within a virtual environment state, determining a virtual control position of a virtual control in the virtual environment state relative to the virtual anchor position, mapping the virtual control position to a physical position of the control in a physical environment corresponding to the physical environment state, and instructing a display device configured to display the virtual environment state to display the virtual environment state such that the virtual control is displayed at the virtual control position.

In some embodiments, the instructions may configure the processor for determining that a view angle of the display device is angled toward the physical position prior to displaying the virtual control via the display device. The instructions may further configure the apparatus for determining that the physical position of the physical object is within a defined area of a physical environment corresponding to the physical environment state that maps to the particular virtual coordinate position, and, in response to determining that the physical position of the user is proximate to the physical position of the control, executing functionality associated with the virtual control. The instructions may configure the processor for executing the functionality associated with the virtual control only in response to determining that the physical position of the user has been proximate to the physical position of the control for at least a threshold period of time. The virtual anchor position may be associated with a physical position of the user's head. The at least one sensor may be at least one of a camera or an infrared receiver. The display device may be a head-mounted display.

According to another exemplary embodiment, a system for providing a virtual reality environment is provided. The system includes circuitry configured to output a virtual environment state provided by virtual environment state management circuitry to at least one display device, the virtual environment state including one or more virtual controls, wherein the virtual environment state comprises a virtual coordinate system for indicating locations of virtual objects within the virtual environment state, circuitry configured to receive data indicating a physical environment state from at least one sensor, wherein the physical environment state comprises a physical coordinate system for indicating locations of physical objects within the physical environment state, physical environment state management circuitry configured to determine a physical anchor position at particular physical coordinates within the physical coordinate system using the data indicating the physical environment state, and the virtual environment state management circuitry. The virtual environment state management circuitry is configured to generate a mapping between the set of virtual coordinates and the set of physical coordinates, determine, based on the mapping, particular virtual coordinates corresponding to the particular physical coordinates, place a virtual control anchor at the particular virtual coordinates, determine virtual control coordinates for the one or more virtual controls according to a virtual control positioning offset by applying the virtual control positioning offset to the particular virtual coordinates of the virtual control anchor, and place the one or more virtual controls within the virtual environment state at the virtual control coordinates.

The display device may be a head-mounted display. The virtual environment state management circuitry may be further configured to display only a portion of the virtual environment state via the display device, and wherein the portion of the virtual environment state is determined based on a view angle of the display device. The physical environment state management circuitry may be further configured to determine a user position, and the virtual environment state management circuitry may be further configured to determine that the user position is proximate to at least one physical coordinate that maps to the virtual control coordinates, and perform a function associated with the virtual control in response to determining that the user position is proximate to at least one physical coordinate that maps to the virtual control coordinates.

According to another embodiment, an apparatus for implementing a virtual control in a virtual reality environment is provided. The apparatus includes means for receiving data indicating a physical environment state, means for processing the data indicating physical environment state to determine a physical position of at least one physical object, means for determining based on the position of the at least one physical object, at least one physical anchor position within the physical environment state, and means for mapping the physical anchor position to a virtual anchor position within a virtual environment state. The virtual environment state includes a plurality of virtual coordinate positions that map to at least a portion of the physical environment state. The apparatus also includes means for determining a particular virtual coordinate position for at least one virtual control from the plurality of virtual coordinate positions by identifying a virtual control positioning offset indicating a relative position with respect to the virtual anchor position and applying the virtual control positioning offset to the virtual anchor position to determine the particular virtual coordinate position, wherein a first relative position between the particular virtual coordinate position and the virtual anchor position corresponds to a second relative position between a particular physical coordinate position mapped to the particular virtual coordinate position and the physical anchor position. The apparatus also includes means for instructing a display device to display the virtual control at the particular virtual coordinate position.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings.

Figure 1:
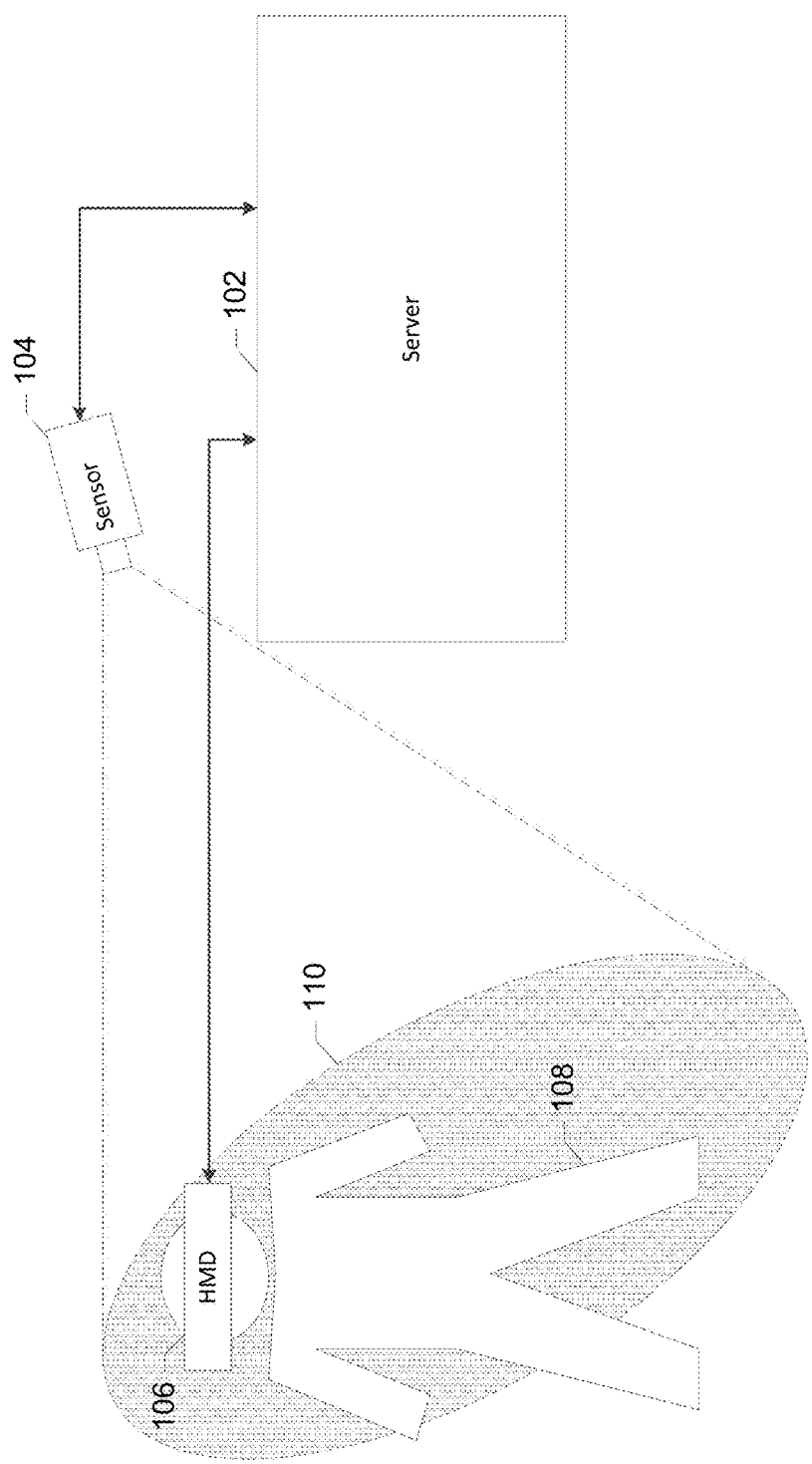
FIG. 1 is a block diagram illustrating an exemplary system within which exemplary embodiments may operate.

The accompanying drawings are not intended to be drawn to scale.

DETAILED DESCRIPTION

Exemplary embodiments provide computer systems, computer-executable methods and one or more non-transitory computer-readable media for receiving gesture input in a virtual reality (VR) environment. In particular, embodiments offer improved techniques for positioning virtual control objects, detecting that a user intends to interact with a virtual control object, and managing gesture inputs provided by virtual control objects.

Glossary of Terms

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to electronic data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the terms "head-mounted display" and "HMD" are intended to refer to any display device that is attached, mounted, projects to, or otherwise provides an image on a surface that remains at a fixed position with respect to a user's viewing angle or line of vision. The term head-mounted display is intended to also include any other peripheral electronics and functionality that may be provided in conjunction with such a device. For example, a head-mounted display may include speakers, headphones, or other electronic hardware for audio output, a plurality of display devices (e.g., the use of two display devices, one associated with each of the user's eyes, to enable a stereoscopic, three-dimensional viewing environment), one or more position sensors (e.g., gyroscopes, global positioning system receivers, and/or accelerometers), beacons for external sensors (e.g., infrared lamps), or the like. Example head-mounted displays include the Oculus Rift™ manufactured by Oculus VR, the HMZ-T3W manufactured by Sony Corp., and the like.

As used herein, the term "virtual environment" is intended to refer a simulated environment with one or more objects that are projected onto or otherwise displayed to a user using an HMD in a manner such that the HMD provides the user with the sensation of being present or immersed within the virtual environment as if the virtual environment physically exists around the user. The term "virtual environment" is offered in contrast to the term "physical environment", which relates to an actual physical space.

The term "virtual environment state" is intended to refer to electronic data describing the virtual environment. The virtual environment state includes data sufficient to define a set of positions or locations of one or more objects associated with that virtual environment. It should be understood that the virtual environment state may be stored in a variety of data structures and/or formats. In some embodiments, the virtual environment state may be maintained by an "engine" that tracks the location, state, and other attributes of objects within the virtual environment state. In some embodiments, the engine may act in conjunction with a graphics device, renderer, or other hardware and software for generating a visual display of the virtual environment.

Although the virtual environment state may typically include an n-dimensional set of coordinates (typically three dimensions), that at least partially correspond to a given physical environment, it should be appreciated that a given virtual environment may not directly correspond to a physical environment. For example, a given virtual environment may allow a user or other objects to change position, change in size, change in shape, or the like in the virtual environment without a corresponding change or interaction in a physical environment. A given virtual environment may also map to a portion of a given physical environment (e.g., limited to an area of the physical environment visible to one or more sensors), and vice-versa (e.g., a limited portion of the virtual environment mapping to a physical environment, with user movement in the physical environment constrained to effecting changes in the limited portion of the virtual environment).

Objects that exist in the physical world may be included in the virtual environment as virtual representations of physical objects, and the term virtual environment should be understood not to exclude such virtual representations. For example, a sensor may detect the presence of a physical object in the physical environment around the user, and create a virtual object within the virtual environment corresponding to the detected physical object. The user may then be able to perceive the presence of the physical object by viewing the virtual object at a position in the virtual environment that corresponds to the position of the physical object in the physical environment.

The term "physical environment state" should be understood to refer to electronic data indicating the known or believed location of physical objects. The physical environment state is based at least in part upon data received from one or more sensors. In some embodiments, the physical environment state is also based on other data, such as derived from previous snapshots of the physical environment state, data from interface devices other than sensors (e.g., a computer keyboard or mouse), or the like.

The term "augmented environment" should be understood to refer to a combined environment including the physical environment and elements of the virtual environment. It should be noted that an augmented environment including elements of the physical environment (e.g., a video or photo image of a physical environment overlaid with virtual elements) is understood to be separate and distinct from a virtual environment that includes virtual elements that correspond to physical objects. For example, a digital photograph overlaid with tags or labels would be an augmented environment, while a system that detects the presence of a user, replaces the user with a virtual three-dimensional model, and then inserts the three-dimensional model into a virtual environment would not be an augmented environment, since the latter example uses entirely virtual constructs.

The term "physical anchor location" should be understood to refer to a position in the physical environment that defines the location of a particular object or objects or a reference defined based on the position of a particular object or objects. For example, a physical anchor location may be located at the center of a HMD worn by a user, or a physical anchor location may be located six inches in front of the an object identified as the user's nose. The physical anchor location may be fixed or dynamic. For example, the physical anchor location may be fixed and determined once upon initialization of the virtual environment, or the physical anchor location may be dynamically defined and moved as the object or reference related to the physical anchor location changes.

The term "virtual anchor location" should be understood to refer to a position in the virtual environment that corresponds to the physical anchor location.

The term "virtual coordinate position" should be understood to refer to a particular point or set of points within the virtual environment.

The term "virtual control" should be understood to refer to a particular object defined within the virtual environment that, upon interaction with the user, causes a particular change in the virtual environment state associated with the virtual control. It should be appreciated that virtual controls are defined within the virtual environment state for performing some sort of function. Although said virtual controls may be dynamically created, destroyed, displayed, hidden, and the like, it should be appreciated that user interaction with a virtual control requires interaction with a specific object or position in the virtual environment state, whether or not said object is visible to the user.

The term "virtual control positioning offset" should be understood to electronic data indicating where to position a virtual control in the virtual environment relative to a virtual anchor location. The virtual control positioning offset may be static or dynamic. For example, each virtual control may have a particular fixed virtual control positioning offset. Alternatively, the virtual control positioning offset may be dynamically determined based on an order in which virtual controls are initialized, enabled, or defined, determined based on whether other virtual controls are already present (e.g., assigning the virtual control positioning offset based on the order in which the virtual controls are initialized), determined based on configuration settings or user preferences, or determined based on user characteristics (e.g., measuring a user's height or wingspan and adjusting the virtual control positioning offset accordingly). The virtual control positioning offset includes electronic data sufficient to determine at least one of a direction component and a distance component.

Overview

Embodiments of the presently disclosed invention generally describe novel systems, methods, and devices for implementing gesture inputs in a virtual environment. Recent advances in technology have led to the proliferation of object detection and positioning systems that may be used to implement gesture control of electronic devices. Capacitive touch panels, infrared emitter/sensor combinations, cameras, and other such sensors and input devices have provided new modalities for detecting the location and actions of the user.

Similarly, advances in electronics miniaturization, decreases in display costs, and increases in graphics processing power have made it practical for consumers to obtain devices capable of providing a virtual reality experience. For example, consumers now have the ability to obtain reasonably priced head-mounted devices (HMDs) that provide a stereoscopic three-dimensional visual experience. Many such devices also include internal accelerometers and position detection modules for determining the location and viewing angle of the user, audio systems for providing sound, and the like. One of the primary anticipated uses for these devices is to enable the user to perceive that they are present in a virtual environment.

However, the inventors have determined that current systems for detecting gesture input are inadequate for use in a virtual reality environment. For example, some current systems lack a fixed reference point for determining gesture input, and require the user to perform some action to indicate to the system they intend to perform a gesture input. At the time of the gesture input, the system dynamically generates a reference point for use in capturing that particular gesture input, and after the gesture input is complete, the reference is removed. For example, such a system may require the user to raise their hand to indicate they wish to begin a gesture input, and gesture inputs may be enabled in response to a sensor detecting the raised hand. Such systems are unsuitable for use in a virtual environment since the dynamically defined reference point lacks any association with objects in the virtual environment. For example, if the user is using the virtual environment to simulate the cockpit of a fighter jet, it may break the user's immersion if the positions of the controls in the cockpit move around depending upon where the user begins their input operation.

Other gesture input systems associate particular inputs with particular coordinates in the physical environment. For example, systems that map a physical environment to a display screen may provide a pixel-to-coordinate mapping such that the user can point to particular location in space and interact with a corresponding element on a display screen. However, such input mechanisms are inflexible and require precise positioning. To return to the fighter jet example, such a system might require the user to sit in precisely the right spot to access the controls of the fighter jet based on a known mapping between the user's physical environment and the "cockpit" virtual environment.

Through applied effort and ingenuity, the inventors have identified solutions to these problems and other problems related to providing user gesture input in the context of a virtual environment. In particular, the inventors have developed methods and techniques that allow for placement and interaction with virtual control objects in a manner that is straightforward and flexible, while still being satisfying to the user and maintaining immersion of the user in the virtual environment. In particular, the inventors have developed techniques for positioning virtual controls in a virtual environment relative to a virtual anchor location. The virtual anchor location is defined based on the detected location of one or more physical objects in the physical environment viewed by one or more sensors. Upon detecting a user interaction with a position in the physical environment that corresponds to the position of the virtual control in the virtual environment, certain actions associated with the virtual control are caused in the virtual environment.

Embodiments also allow for dynamic determination of the physical anchor location. Through detection of portions of the user or objects located on the user (e.g., the position of a HMD worn by the user), embodiments may advantageously calibrate the virtual anchor location to the particular characteristics of the user. For example, taller users may have a virtual anchor location at a larger "z" coordinate in the virtual environment than shorter users.

Embodiments also include novel ways for interacting with virtual controls. The inventors have recognized that gesture interaction with virtual controls presents new challenges not previously encountered with respect to physical analogs to said controls or even gesture interaction with non-virtual world controls (e.g., gesture interaction with interfaces displayed on 2-dimensional monitors). To solve these challenges, the inventors have developed novel techniques for identifying when a user may interact with a virtual control, and how that interaction is performed.

The inventors have also realized that unique problems exist when performing gesture inputs, particularly in the case of gesture inputs performed in a virtual reality environment. Traditional input mechanisms, such as keyboards, mice, switches, buttons, and the like generally provide multiple layers of feedback due to the physical nature of the input device used. When users press keys on a keyboard or click a mouse button, they receive tactile and haptic feedback notifying them that the input was successful, or providing visual feedback as a cursor moves. In this manner, the input device functions as a physical proxy for input provided to the software environment. For example, the tactile and haptic feedback provided to the user via a mouse "click" serves as a physical proxy to indicate to the user that an intent to interact with an interface control element displayed underneath the mouse cursor was registered.

Gesture inputs provided in a virtual environment do not provide such physical feedback mechanisms. However, the inventors have identified that it is possible to provide alternative feedback mechanisms through the use of the virtual environment. The inventors have realized that the virtual environment may be used to provide new methods of feedback for detecting the user's intent, conveying confirmation of the detected intent, detecting execution of an input, conveying confirmation of execution (or failure to execute) of the input, and conveying arrival at new state in response to the input. Embodiments of the present invention thus function to provide such feedback in a virtual environment without a corresponding physical proxy.

It should also be understood that the embodiments presented herein are particularly directed to methods, apparatuses, systems, and computer program products for providing input to computers generating a virtual environment and otherwise causing the computers to perform certain functions via input provided within a virtual environment. As such, these embodiments are necessarily related and directed to improvements for providing such electronic input and causing said computers to operate in particular improved manners, and these improvements address technical problems unique to virtual environments provided by computers.

Virtual control objects such as described herein may be utilized to implement a variety of functionality across many different technical disciplines. Such control objects may be employed to improve home automation systems (e.g., interfacing with home temperature, lighting, and security systems), to control factory operations (e.g., controlling robotic equipment, security systems, observing workers), to control mobile objects such as drones, and the like. The use of a virtual environment may also allow the user to leverage cameras or other sensors coupled to a remotely controlled device or system to present the user with the experience of being in the physical location of the controlled object.

The inventors have also recognized that virtual environments may be utilized to capture and playback a user's local environment. The capture of local sensor data about a user's physical environment may allow the user to record audio, video, and other gathered sensor information about their physical environment for later review. For example, if the user has a home equipped with sensors for capturing a physical environment, the user may enable recording of that sensor data during a particular event (e.g., a child's birthday party), so that later on the user can playback the sensor readings to recreate the physical environment in a virtual scenario. Such embodiments may allow the user to relive recorded events or review events for which they were not present (e.g., to simulate being on the field of the Superbowl during the game, or to play back a wedding reception and view the event from various virtual perspectives).

The inventors have also recognized deficiencies in methods and systems for tracking user positions and calibrating sensors used for position tracking for providing input to a virtual environment. To this end, the inventors have developed novel systems for integrating data received from infrared sensors, accelerometers, gyroscopes, magnetometers, and the like. Tracking data received from these disparate systems may be merged and smoothed to improve techniques for identifying user positions. Furthermore, the inventors have calibration mechanisms for adjusting input from different sensors. The inventors have developed techniques for determining when a HMD is placed on the user's head by monitoring data received from multiple sensors, and performing various detection and calibration actions in response. For example, when embodiments detect that the HMD has been picked up and placed on the user's head based on accelerometer readings, the user's position may be detected in three dimensional space and calibrated to a virtual environment coordinate system.

The inventors have also realized that a variety of interfaces and sensors may be employed to interact with a virtual environment. To interact with the virtual control objects as described herein (and to enable other interactions not provided by the virtual control objects), the inventors have realized that various devices providing different feedback mechanisms may be employed. For example, the use of specially designed gloves or shoes may provide tactile and/or haptic feedback related to touching buttons, feeling textures of items, and the like.

The inventors have also developed systems that provide novel features for sharing an environment with other users. Sensor data from both local and remote devices may be employed to provide proximity alarms and other feedback related to distance between the user and both physical objects in the user's local physical environment (e.g., other users, furniture), and virtual objects in the virtual environment (e.g., an avatar of another user participating in the virtual environment from another physical location).

System Architecture and Example Apparatus

Some exemplary embodiments of the present invention will now be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Methods, apparatuses, and computer program products of the present invention may be embodied by any of a variety of devices. For example, the method, apparatus, and computer program product of an example embodiment may be embodied by a networked device, such as a server or personal computer in communication with a HMD and one or more sensors.

Additionally or alternatively, the computing device may include fixed or networked computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. A server 102 may function to communicate with one or more sensors 104 and an HMD 106. The server 102 may include one or more computers that include hardware and software configured to generate and manage a virtual environment that is displayed to a user via the HMD 106. The server 102 may also receive data from one or more sensors 104 to determine a state of a physical environment 110. A detailed exemplary embodiment of the server 102 is described further below with respect to FIG. 2.

The HMD 106 may send and receive electronic data from the server 102. For example, the HMD 106 may send data to the server 102 indicating readings from one or more accelerometers or other position sensors contained in the HMD 106. The HMD 106 may receive data indicating video content to display via one or more displays included in the HMD 106 and audio content to output via speakers, headphones, or the like included in the HMD 106. A detailed exemplary embodiment of the HMD 106 is described further below with respect to FIG. 3. It should also be appreciated that, while the embodiments described herein are generally described with respect to a HMD, embodiments may also apply to other virtual environments that do not use HMD technology. For example, similar input techniques could be utilized in a Cave Automatic Virtual Environment (CAVE) system or other display suitable for displaying a virtual environment.

The sensor 104 may be any sensor operable to receive information about a user or the user's physical environment that may be employed by the server 102 to generate the virtual environment. For example, the sensor may be a Kinect® sensor manufactured by Microsoft, a Leap Motion® controller manufactured by Leap Motion Inc., a data glove, a wand such as the PS Move® manufactured by Sony Corp., a motion capture system, a digital camera, a capacitive touch interface, or the like. The sensor 104 may provide data in a raw format to the server 102, where the raw data may be converted into position information indicating the position of physical objects in the physical environment 110 perceived by the sensor. In some embodiments, multiple sensors may be implemented and data from the sensors may be processed and combined together to determine the positions of objects within the physical environment. The interaction between the sensors and the virtual environment is described further below with respect to FIG. 4.

Example Apparatuses for Implementing Embodiments of the Present Invention

Figure 2:
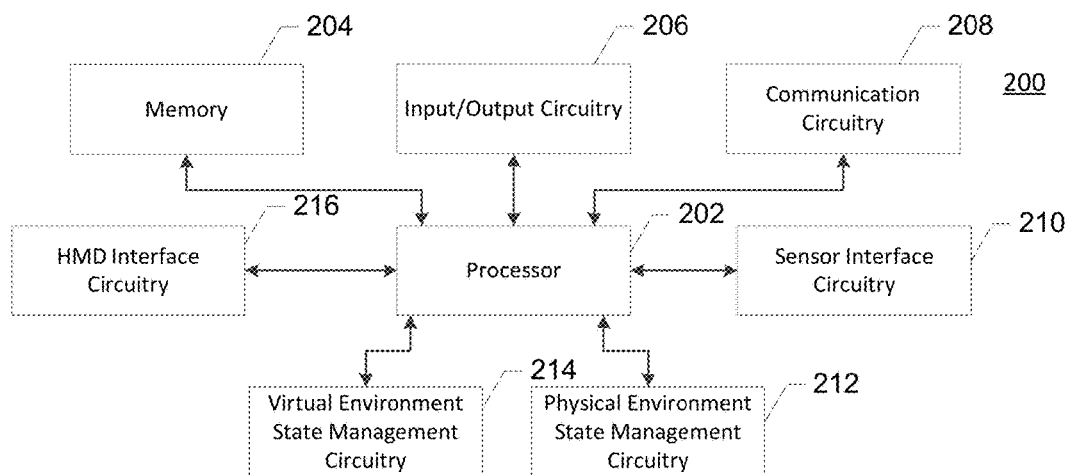
FIG. 2 is a block diagram illustrating exemplary components of a computing device for use as a server in accordance with certain exemplary embodiments.

The server 102 may be embodied by one or more computing systems, such as the apparatus 200 shown in FIG. 2. As illustrated in FIG. 2, the apparatus 200 may include a processor 202, a memory 204, input/output circuitry 206, communications circuitry 208, sensor interface circuitry 210, physical environment state management circuitry 212, virtual environment state management circuitry 214, and HMD interface circuitry 216. The apparatus 200 may be configured to execute the operations described above with respect to FIG. 1 and below with respect to FIGS. 4-10. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, also software for configuring the hardware. For example, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality used by other components of the apparatus 200.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s)

The sensor interface circuitry 210 may include hardware configured to send instructions to, and receive data from, one or more sensors coupled to the server, such as the sensor 104 described above with respect to FIG. 1. The sensor interface circuitry 210 may include electrical connections configured to, wired or wirelessly, communicate with the sensors. The sensor interface circuitry 210 may also include processing circuitry, such as the processor 202, to execute one or more tools, drivers, application programming interfaces (APIs) or the like for communicating with the sensors. It should also be appreciated that, in some embodiments, the sensor interface circuitry 210 may include a separate processor, specially configured field programmable gate array (FPGA) or application specific interface circuit (ASIC) to perform the functions described herein. The sensor interface circuitry 210 is therefore implemented using hardware components of the apparatus configured by either hardware or software for implementing the functions enumerated above.

In some embodiments, the sensor interface circuitry 210 may be configured to directly interface with a network, such as via the network interface circuitry 208 to transmit sensor data to a remote computer. Transmission of sensor data to a remote computer may allow the remote computer to more accurately recreate physical objects (such as the user) detected within the sensor data of the local computer. The inventors have also developed various techniques for receiving, managing, utilizing, and transmitting such sensor data to and from other computers. Further example embodiments of such methods, systems, and device components for supporting a multi-user virtual environment are provided in concurrently filed U.S. patent application Ser. No. 14/608,054, filed Jan. 28, 2015 entitled "METHODS AND APPARATUSES FOR IMPLEMENTING A MULTI-USER VIRTUAL ENVIRONMENT", the entire contents of which are herein incorporated by reference.

The physical environment state management circuitry 212 includes hardware configured to manage a physical environment state. As noted above, the physical environment state includes electronic data indicating the perception of locations of one or more objects in a physical environment measured by one or more of the sensors. The physical environment state management circuitry 212 may process data received by the sensor interface circuitry 210 to estimate, predict, or detect the locations of objects in the physical environment and store said locations within or as the physical environment state. The physical environment state management circuitry 212 may include processing circuitry, such as the processor 202, for detecting objects using the sensor data and other sources and for storing such object locations. In some embodiments, the physical environment state management circuitry 212 may also determine the location of a physical anchor location, or determine that a particular object should be indicated as a physical anchor. It should also be appreciated that, in some embodiments, the physical environment state management circuitry 212 may include a separate processor, specially configured field programmable gate array (FPGA) or application specific interface circuit (ASIC) to perform the functions described herein. The physical environment state management circuitry 212 is therefore implemented using hardware components of the apparatus configured by either hardware or software for implementing the functions enumerated above.

The virtual environment state management circuitry 214 includes hardware configured to manage a virtual environment state. As noted above, the virtual environment state includes electronic data indicating the locations of one or more objects in a virtual environment. The virtual environment state management circuitry 214 may also implement other aspects of a simulation to control the virtual environment state. For example, the virtual environment state management circuitry 214 may manage the rate at which the virtual environment updates, the resolution of coordinate locations of objects within the virtual environment, simulation of interaction between objects in the virtual environment, and the like. The virtual environment state management circuitry 214 may include processing circuitry, such as the processor 202, for managing the virtual environment. The virtual environment state management circuitry 214 also functions to determine a virtual anchor location within the virtual environment for use in determining the location of one or more virtual controls in the virtual environment. It should also be appreciated that, in some embodiments, the virtual environment state management circuitry 214 may include a separate processor, specially configured field programmable gate array (FPGA) or application specific interface circuit (ASIC) to perform the functions described herein. The virtual environment state management circuitry 214 is therefore implemented using hardware components of the apparatus configured by either hardware or software for implementing the functions enumerated above.

The virtual environment state management circuitry 214 may work in conjunction with the physical environment state management circuitry 212 and the sensor interface circuitry 210 to identify the presence of the user and other physical objects within the physical environment. The detected presence of the physical objects may cause various interactions with the virtual environment, including but not limited to causing virtual representations of those physical objects to be included in the virtual environment. Exemplary techniques, processes, systems, and devices for detecting these objects and facilitating presentation of physical objects in a virtual environment are described further in concurrently filed U.S. patent application Ser. No. 14/608,067, filed Jan. 28, 2015, entitled "METHODS AND APPARATUSES FOR PROVIDING VIRTUAL DISPLAY OF A PHYSICAL ENVIRONMENT", the entire contents of which are herein incorporated by reference.

The HMD interface circuitry 216 functions to provide electronic data to and from a HMD to enable the user of the HMD to experience the virtual environment via the HMD and to provide sensor data to the virtual environment state management circuitry 214. For example, the HMD interface circuitry 216 may provide display output to one or more displays included in the HMD to display a portion of the virtual environment to the user, and receive input form one or more accelerometers included in the HMD to determine a user viewing angle to assist the virtual environment state management circuitry 214 to determine which particular portion of the virtual environment to display on the HMD display(s). In some embodiments, the HMD interface circuitry 216 includes a processor or graphics processing unit (GPU) to enable display output to the HMD. It should be appreciated that in some embodiments the virtual environment state management circuitry may also share or utilize the same processor or GPU to manage the virtual environment state to assist with managing the virtual environment. In some embodiments, interface with the HMD is enabled via one or more drivers or APIs that send data as a single signal or other particularly defined communication technique uniquely associated with the HMD, while in other embodiments the HMD interface circuitry 216 communicates directly with particular components of the HMD (e.g., a single video-out to each display of the HMD, a single audio-out for audio components of the HMD, data inputs for each sensor coupled to the HMD).

The HMD interface circuitry 216 may include processing circuitry, such as the processor 202, for providing data to the HMD. It should also be appreciated that, in some embodiments, the HMD interface circuitry 216 may include a separate processor, specially configured field programmable gate array (FPGA) or application specific interface circuit (ASIC) to perform the functions described herein. The HMD interface circuitry 216 is therefore implemented using hardware components of the apparatus configured by either hardware or software for implementing the functions enumerated above.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Figure 3:
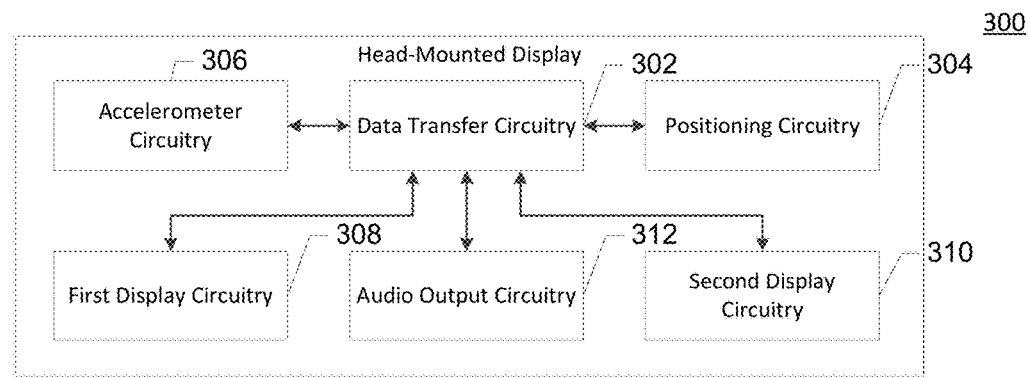
FIG. 3 is a block diagram illustrating exemplary components of a head-mounted display for use in a virtual reality system in accordance with some exemplary embodiments.

Referring now to FIG. 3, a block diagram is illustrated showing an example HMD, apparatus 300 that enables a user to experience a feeling of immersion in a virtual environment through the use of a head-mounted display screen. The apparatus 300 may include or otherwise be in communication with data transfer circuitry 302, position location circuitry 304, accelerometer circuitry 306, first display circuitry 308, second display circuitry 310, and audio output circuitry 312. As noted above, each of the components of the HMD may, in some embodiments, be implemented as a single housing with individual discrete components not in communication with one another (e.g., two separate displays each receiving a separate input signal, headphones and/or a microphone with discrete audio input/output signals, accelerometers that communicate directly with components of a server apparatus such as the apparatus 200, and the like), while in other embodiments the HMD apparatus 300 may be implemented as multiple components in communication with one another and with a server apparatus 200 via particular data transfer circuitry 302. The data transfer circuitry 302 may thus include electronic components configured to process electronic signals from the different components of the HMD and translate said components into a signal, signals, stream, or streams suitable for consumption by a server 200, and translate a signal, signals, stream, or streams from the server into signals suitable for consumption by the individual components of the HMD.

The HMD may include accelerometer circuitry 306 for detecting movement, pitch, bearing, orientation, and the like of the HMD. This information may be provided to a server for use in determining which area of the virtual environment corresponds to the orientation/bearing of the HMD, so that said corresponding area of the virtual environment may be displayed via the first display circuitry 308 and/or second display circuitry 310.

The positioning circuitry 304 may include electronics for configuring and communicating with location services modules and functionality associated with the HMD. For example, embodiments of the HMD apparatus 300 may include one or more infrared beacons that may be turned on and off in response to signals from a server. These infrared beacons may enable detection by infrared sensors coupled to the server. The positioning circuitry 304 may thus function to turn said infrared beacons on and off, cause the infrared beacons to blink at a particular rate or in a particular pattern, and otherwise assist with location detection and physical environment calibration functions. In some embodiments the HMD may include a global positioning system receive as part of the positioning circuitry 304, and it should be readily appreciated that a variety of different location and positioning technologies could be employed to assist with detection of the position of the HMD apparatus 300.

The first display circuitry 308 and the second display circuitry 310 include hardware, such as a projection screen, liquid crystal display panel, or the like for displaying signals received from the server. It should be appreciated that the first display circuitry 308 and the second display circuitry 310 may share some common hardware and/or software elements. For example, in some embodiments each of the first display circuitry 308 and the second display circuitry 310 are entirely separate displays receiving separate input signals. In other embodiments, the first display circuitry 308 and the second display circuitry 310 may include a single display panel with a separation by a physical element of the HMD (e.g., a blocking panel positioned near the user's nose). In yet further embodiments, a single display signal may be provided to circuitry which may split the signal to create two different sources for two separate display panels. The use of two displays in this manner allows for a server to output two separate images which may be employed to create a stereoscopic three-dimensional image. However, it should also be appreciated that in some embodiments the HMD may include only a single display or not even display a stereoscopic image at all, but still serve to display a virtual environment to the user of the HMD and enable gesture interaction with that virtual environment in accordance with embodiments of the present invention.

The HMD apparatus 300 may include audio output circuitry 312 configured to output an audio signal. For example, the HMD apparatus 300 may include built-in speakers, headphones, or the like for outputting sounds to the user wearing the HMD.

Example Virtual Environment Gesture Input Data Flow

Figure 4:
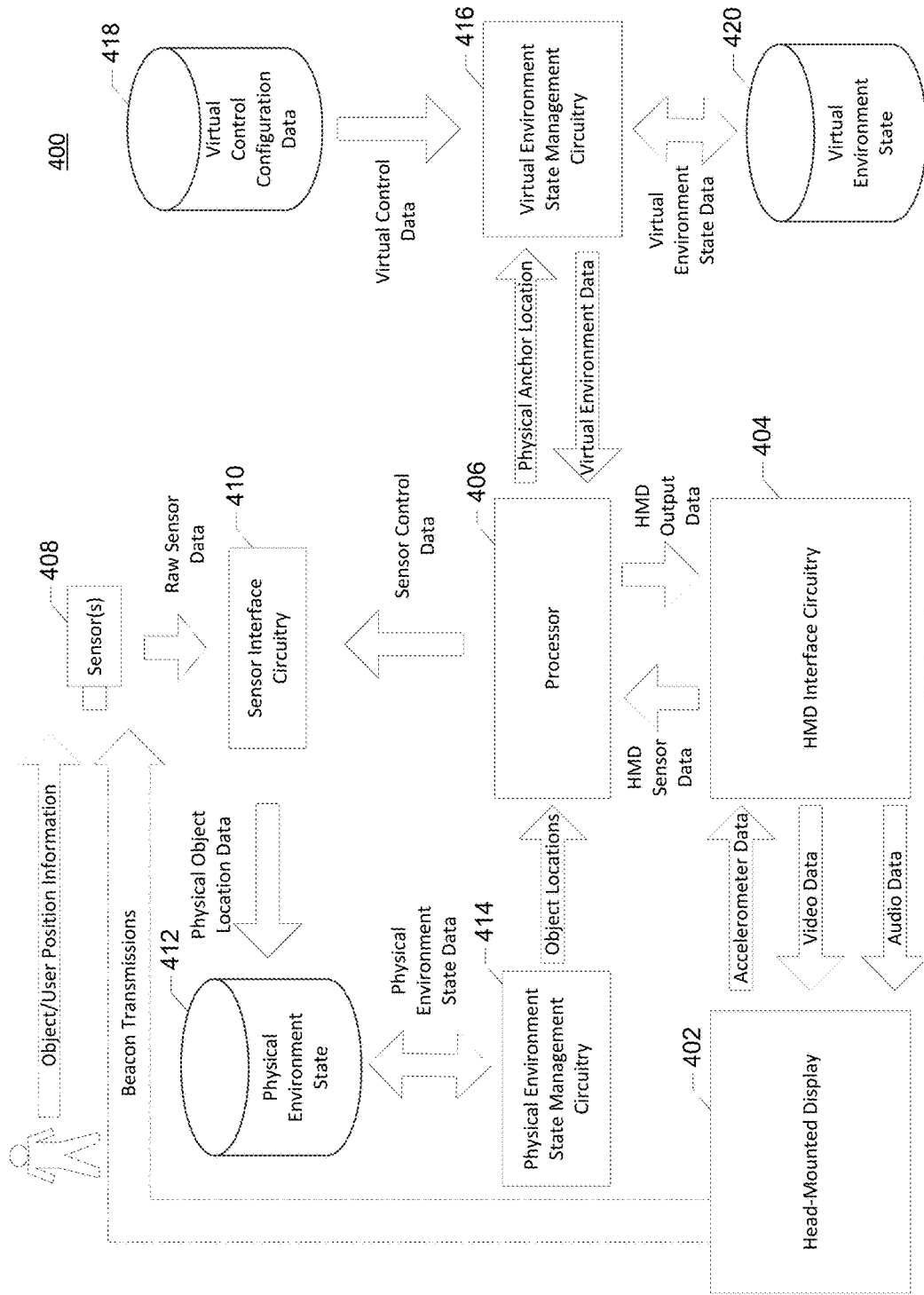
FIG. 4 is a data flow diagram illustrating the flow of electronic data between different components of a virtual reality system in accordance with some exemplary embodiments.

FIG. 4 depicts an example data flow 400 illustrating interactions between different components of a virtual reality system operable to immerse a user in a virtual environment and to receive gesture inputs from a user to interact with that virtual environment. In particular, the data flow 400 illustrates how electronic data received from a head-mounted display (HMD) 402 and one or more sensors 408 may be processed to position one or more virtual controls in a manner that allows the user to interact with said virtual controls according to embodiments of the present invention. Elements of the data flow 400 may correspond to elements described above with respect to FIGS. 1-3, however it should be understood that the components of the data flow 400 may also be implemented in additional or alternative configurations than those described above. For example, in some embodiments the entire virtual-reality system may be implemented as part of the HMD without the need for a separate server or sensors.

The HMD 402 may provide sensor data from sensors coupled to the HMD (e.g., gyroscopes and/or accelerometers) to HMD interface circuitry 404, and receive video and audio data via the HMD interface circuitry 404 in a manner similar to that described above with respect to FIGS. 1-3. The HMD interface circuitry 404 may interpret sensor data received from the HMD and provide processed HMD sensor data to a processor 406. The sensor data may be used to determine various aspects of the user and the HMD 402, including but not limited to the viewing angle and bearing of the user and HMD 402.

It should also be appreciated that in some embodiments, the sensor data received from the HMD 402 may be provided to the processor 406 without further analysis or processing by the HMD interface circuitry 404. The HMD interface circuitry 404 may receive output data (e.g., audio and video data) from the processor 406 to be provided to the HMD 402 for output. Although the output data may typically comprise a virtual world state, it should be appreciated that on some occasions the output data may include audio or video data not associated with the virtual world state (e.g., where the user of the HMD wishes to watch a movie).

The sensor(s) 408 may be any device operable to capture information about a physical environment. For example, as described above, the sensors may be cameras, infrared detectors, capacitive touch or proximity sensors, or the like. The sensor(s) 408 capture raw sensor data that may be indicative of user and object position information (e.g., in cases where a user and/or object is present in an area visible to the sensor and the raw sensor data is sufficient to assist with differentiation of the user and/or object from the background and from other objects). The sensor(s) 408 may also capture beacon transmissions from the HMD 402 and/or other signaling devices (e.g., handheld input devices with infrared emitters).

The sensor(s) 408 provide raw data to sensor interface circuitry 410. In some embodiments, the sensor interface circuitry 410 may function to identify the position of the user and/or objects from the raw sensor data. The sensor interface circuitry 410 may function as a depth renderer, evaluating depth and other location data received by the sensor(s) 408 to determine the position of objects in the physical environment. This physical object location data may be stored in a physical environment state 412. In some embodiments, the sensor interface circuitry 410 is operable to merge data from multiple sensors and derive the position of objects using multiple different data sources. It should be appreciated that, while the present example describes the sensor interface circuitry 410 as determining the location of objects, in other embodiments the location of objects may be determined by the processor 406 without the use of special-purpose circuitry, and the sensor interface circuitry 410 may function merely to receive raw input form the sensor(s) 408 (e.g., via an API) and provide the raw data to the processor 406.

The processor 406 may also provide sensor control data to the sensor interface circuitry 410 for the purpose of configuring and controlling the operation of the sensor(s) 408. For example, the processor 406 may send sensor control data to activate the sensor(s) 408, deactivate the sensor(s) 408, change the viewing angle of the sensor(s) 408, adjust the gain of the sensor(s) 408, or the like.

The physical environment state 412 may include one or more databases, data structures, or the like that indicate the position of objects within the physical environment visible to the sensor(s) 408. The physical environment state 412 may be accessed by physical environment state management circuitry 414 to provide the location of particular objects in the physical environment state to the processor 406. For example, the processor 406 may request the location of particular objects form the physical environment state management circuitry 414, request the location of all identified objects, or the like. In some embodiments, the physical environment state management circuitry 414 is capable of providing a location, velocity, size, and/or other features and characteristics of objects identified within the physical environment state 412 upon request.

The processor 406 may determine a physical anchor location from the object locations provided by the physical environment state management circuitry 414. The processor 406 may determine the physical anchor location by identifying a particular object from the physical environment state and determining that that particular object has characteristics of an object associated within a physical anchor. For example, the processor 406 may determine the location of the HMD, the user's head, the user's shoulders, the user's center of mass, or some other object based on data provided by the physical environment state management circuitry 414. The location of this object, or some reference to that object (e.g., a particular distance above, below, in front of, behind, or the like) may be used as the physical anchor location. Example embodiments of methods for determining physical anchor locations are described further below with respect to FIG. 6.

The physical anchor location may be provided to virtual environment state management circuitry 416. The virtual environment state management circuitry 416 functions to manage, monitor, and control a virtual environment, which is stored as a virtual environment state 420 and updated by writing virtual environment state data to the virtual environment state by the virtual environment state management circuitry 416. The virtual environment state management circuitry 416 may receive the physical anchor location and map the physical anchor location to a position within the virtual environment to be used as a virtual anchor location. The virtual anchor location may be used as an origin or other reference to position one or more controls within the virtual environment.

Information relating to one or more virtual controls may be stored in a set of virtual control configuration data 418. The virtual control configuration data 418 includes electronic data indicating the function, position, and any other configuration settings associated with virtual controls. For example, the virtual control configuration data 418 includes one or more virtual control positioning offsets for use in positioning a virtual control with respect to a determined virtual anchor point. The virtual control positioning offsets may, as described above, be determined dynamically or be static for a particular virtual control.

It should also be appreciated that the location at which a given virtual control is positioned may be different from a location in which a user must gesture to interact with the virtual control. As such, the virtual control configuration data 418 may store data configuring each value separately. For example, a virtual control may be displayed at a distance of 2 meters from a user, but the user may only need to reach out 0.5 meters to interact with the control. As indicated above, embodiments may include various mechanisms for communicating these different distances and interaction parameters to the user.

Upon determining the virtual anchor position and the virtual control positioning offset for a particular virtual control, a position for an associated virtual control may be determined by applying the virtual control positioning offset to the virtual anchor position. Applying the offset may include rotating, translating, scaling, and otherwise adjusting the virtual control, using the virtual control anchor as an origin. The determined virtual control position may be stored in the virtual environment state 420.

The virtual control configuration data 418 may also include data for configuring an interactivity indicator that identifies a radius or distance about the virtual control within which various interactions are possible. For example, in some embodiments, as the user directs their field of vision to the virtual control or moves their hand/arm/input device proximate to the virtual control, the virtual control may display an interactivity indicator as a circle or other indicator around or about the virtual control. The interactivity indicator denotes the area to which the user must gesture, enter, or otherwise activate in order to interact with the virtual control. The virtual control configuration data 418 may include data indicating whether and when to display interactivity indicator, the size and shape of the interactivity indicator, or the like.

It should be appreciated that the interactivity indicator is separate and distinct from the virtual control itself and any other indicators used to indicate the presence of the virtual control. For example, some embodiments may display the virtual control within the virtual environment (e.g., as an orb or sphere). When the user performs some action (e.g., looking in a particular direction such that the orb or sphere enters a particular frame of view, such as the center of the user's field of vision), the virtual control may receive a first highlight indicating its presence (e.g., by placing a bracket around the virtual control). Upon the user taking an action indicating intent to interact with the virtual control (e.g., moving their hand up toward the virtual control), the interactivity indicator may be displayed to provide the user with more information about how to interact with the virtual control, such as the area within which the user must gesture, or the type of gestures accepted by the virtual control (e.g., radial menu, confirmation list, "point and flick" or the like).

Periodically or in response to an inquiry from the processor 406, the virtual environment state management circuitry 416 may provide virtual environment data to the processor 406. The virtual environment data may include the location of various objects within the virtual environment state to be used in outputting data to the HMD for display to the user. In some embodiments, the virtual environment data is constrained by information provided by the processor or other elements of the virtual reality system. For example, the processor 406 may indicate that the HMD 402 is located at a certain pitch and direction, and therefore the display data output to the HMD 402 should be limited to a portion of the virtual environment that would be visible to the user with a viewing angle at that particular pitch and direction.

Figure 5A:
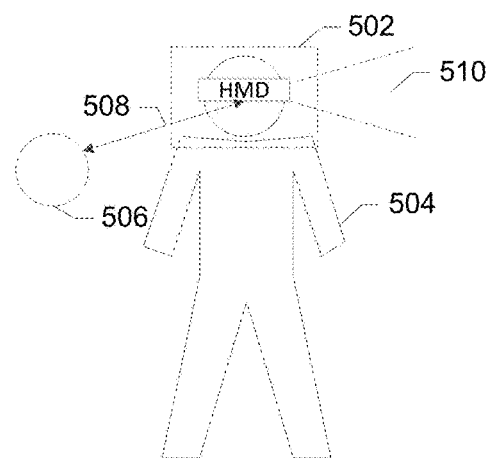
FIGS. 5A-5O are illustrations of example gesture interactions with a virtual reality system employing exemplary embodiments of the present invention.
Figure 5B:
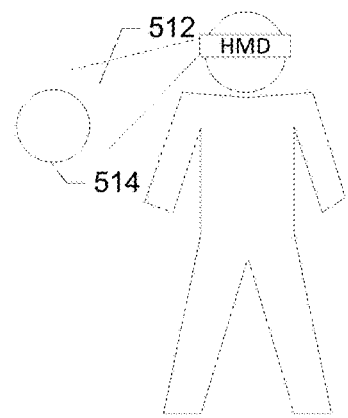
Figure 5C:
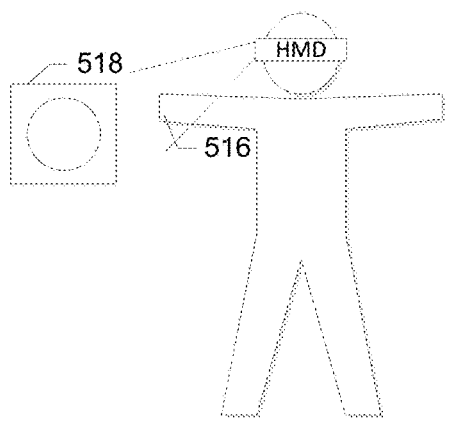
Figure 5D:
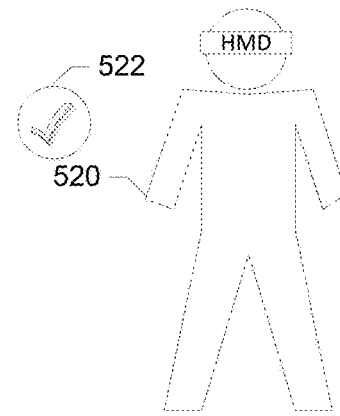
Figure 5E:
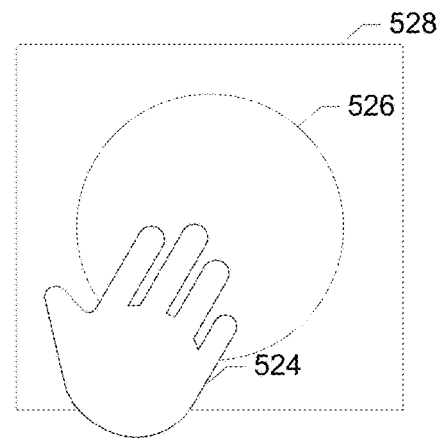
Figure 5F:
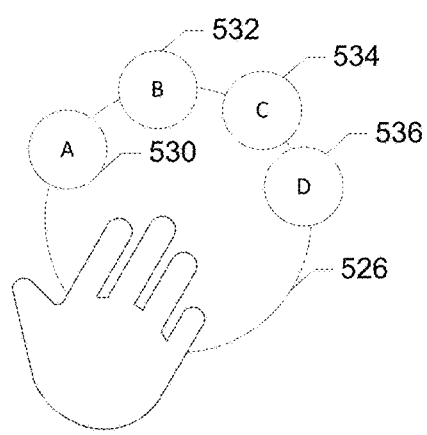
Figure 5G:
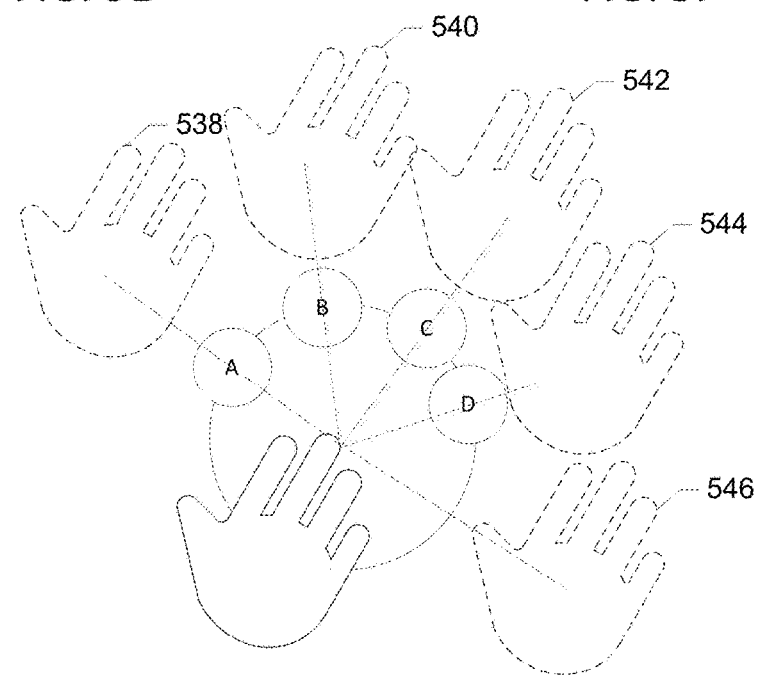
Figure 5L:
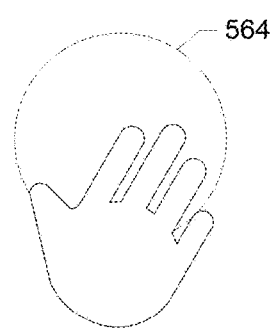
Figure 5M:
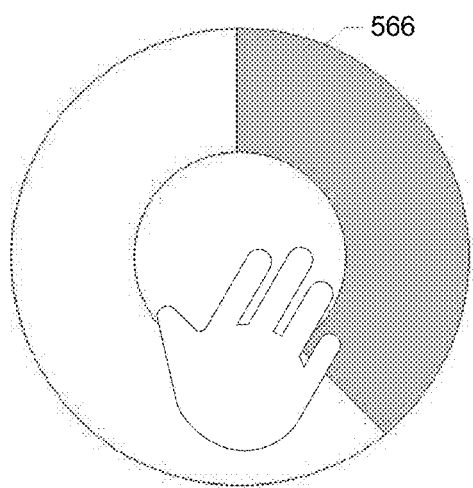
Figure 5N:
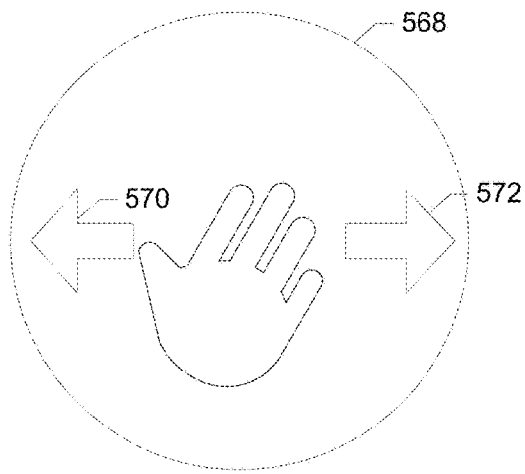
Figure 5O:
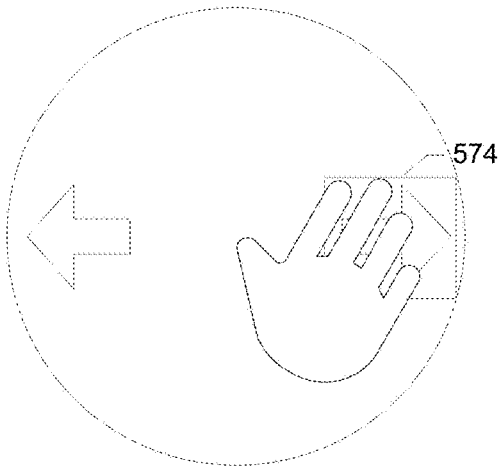

Example Illustrations of Gesture Input Using Virtual Controls in Accordance with Exemplary Embodiments FIGS. 5A-5O are illustrations of example gesture interactions with virtual controls in accordance with exemplary embodiments of the present invention. It should be noted that although the instant control mechanisms are described in the context of a virtual reality system, these mechanisms could also be applied to augmented reality environments or physical environments. For example, a user may be in an environment that does not include a HMD, but which otherwise includes various sensors for receiving gesture inputs and processing equipment for implementing virtual controls. In such an environment, the user may still perform gesture control inputs via virtual controls that are invisible to the user. As a specific example, a car dashboard may include sensors for detecting gesture inputs and hardware and software for implementing virtual controls associated with particular components of the car. When the user gestures toward a particular component (e.g., an air conditioning control panel or radio head unit), the user may interact with virtual controls that are invisible to the user (e.g., pointing to the air conditioning control panel and swiping to the right to increase a temperature, or pointing to the radio head unit and rotating their hand to the left to reduce the volume). These virtual controls may be implemented in the same manner as virtual controls described herein with respect to the virtual environment, but the user may not be able to see the virtual controls due to the lack of a display. The user may employ these "invisible" virtual control objects using gesture inputs in the same or a similar manner as described herein with respect to the virtual environment.

Detection of "interaction" with a particular virtual control object may be performed via a variety of mechanisms. One particular technique that may be employed relates to determining a relative position of a user perspective (e.g., the location of a "camera" viewing the virtual environment) with respect to the virtual control object, and detecting when the user performs a gesture on a line between the virtual control object and the user perspective. In some embodiments, virtual control objects may be presented so as to appear at a particular angle or within a particular range of angles to the user perspective at all times, such as perpendicular to the user perspective. Embodiments may identify when, for example, the user places their hand on the line between the indicator and the camera position, within a particular angular tolerance between the line drawn between the user's position and the user's hand and the line drawn between the virtual control object and the user's position. Embodiments may also detect when the user moves their hand beyond a certain percentage of their arms reach or beyond a certain other distance parameter. In response to detecting the user's hand within the certain angular tolerance along the particular line between the user's position and the virtual control object and detecting the movement of the hand beyond the distance parameter, the virtual control may be activated. It should be readily appreciated that parameters such as the angular tolerance and the distance parameter may be tunable or otherwise configurable based on a variety of factors, including but not limited to the particular virtual control (e.g., stored as virtual control configuration data), or the particular user (e.g., based on user preference settings or calibrated to the user's height).

The interactions illustrated in FIGS. 5A-5O are made possible by a mapping between the physical coordinates of the user and the virtual coordinates of objects within the virtual environment. By displaying these virtual controls via the HMD, embodiments of the present invention map the physical coordinates of the user to the virtual environment and detect when the physical coordinates of the user match virtual coordinates of the virtual controls. The use of the HMD allows for the user to easily visualize where these virtual coordinates are in relation to their physical coordinates.

These techniques allow for implementation of a wide variety of novel interactions that were previously impossible. The virtual controls may be employed as origin points or fixed references for enabling a variety of gesture inputs. This functionality may allow the user to perform gestures with respect to elements of the virtual environment to perform various contextual actions. For example, a lightning cloud in the virtual environment may function as a control that allows the user to hold up their hand to the cloud, gather a bolt of lightning, and perform a gesture to hurl the bolt of lightning at an opponent. The use of an HMD allows the user to visualize their actions as they are performed and to provide real-time feedback as to the impact the user's gestures are having on the virtual environment. Other possible gesture inputs include a "point-and-flick" gesture, where the user raises their hand to a virtual control, then performs a "flick" gesture to send an object in the direction of the flick relative to the virtual control.

Embodiments may also detect movement vectors with respect to known positions of virtual controls. For example, embodiments may use the position of the virtual control as an origin, and evaluate user gestures performed on that virtual control to detect a magnitude and direction of gesture movements with respect to the origin point. In this manner, embodiments map physical locations of gestures to virtual coordinates in the virtual environment, and then perform appropriate actions based on the mapping of the physical locations to the virtual coordinates.

Yet further embodiments may leverage the ability to track the position of the user's viewing angle to combine the position of the virtual control object, the physical gestures and position of the user, and the direction and origin of the user's viewing angle into signals that are interpreted by the system to produce a single input to the virtual environment. Exemplary embodiments for performing gesture inputs using virtual control objects will now be described. It should be appreciated that various additional and alternative inputs may also be performed, and these examples are not intended to be limiting.

FIGS. 5A-5D illustrate an exemplary gesture input system for detecting, interacting with, and activating a virtual control. The virtual control depicted in FIGS. 5A-5D is a basic input device that is capable of being activated for interaction based on the user's angle of view, after which the user may utilize the virtual control to initiate a particular function. The virtual control may become visible, or change its appearance to indicate that it is capable of interaction, based on a determination that the virtual control object is within a certain viewing angle of the user. This allows the users to interact with the virtual environment in novel ways by allowing interactive objects to appear in the virtual environment only when within a certain view angle. In this manner, the virtual environment can be presented to the user without interactive virtual controls, or with only certain interactive controls, being visible to the user unless the user turns their head in a manner that brings the virtual control within the user's viewing angle. FIG. 5A illustrates the relative positioning of a virtual control with respect to a physical and virtual anchor in accordance with exemplary embodiments. In particular, FIG. 5A illustrates a user 504 wearing a HMD. The position of the HMD has been detected by the system and established as a physical anchor location 502. A virtual anchor location is established at virtual coordinates corresponding to the center of the HMD, and a virtual control positioning offset of 508 is used to locate a virtual control 506. In the present example, the virtual control is located out from the user's body approximately level to the user's right shoulder.

The present example illustrated in FIG. 5A also illustrates how, in some embodiments, enablement of the virtual control may be performed in conjunction with monitoring the user's viewing angle 510. Since the user may not be aware of all of the virtual controls available in the virtual environment, embodiments may not activate certain virtual controls until the user has viewed, acknowledged, or otherwise been made aware of the existence of a particular virtual control. In FIG. 5A, the user's viewing angle 510 has not yet resulted in display of the area of the virtual environment corresponding to the virtual control 506, so the virtual control remains deactivated.

As illustrated in FIG. 5B, upon the user's viewing angle 512 being directed to a portion of the virtual environment containing the virtual control 514, the virtual control may be activated and available to receive input from the user. FIG. 5C illustrates the process by which the user may interact with the virtual control, by moving his/her hand 516 into a physical location corresponding to the virtual control. Upon the user's hand moving across or onto the virtual control, the virtual control is highlighted, such as by placing a box 518 around the virtual control to show it is activated. FIG. 5D illustrates how, once the control is activated, the user can move their hand 520 away from the control to cause the control to initiate its respective function 522. An exemplary embodiment of a method for implementing such a control is described further below with respect to FIG. 11.

FIGS. 5E-5G illustrate the use of virtual controls to implement a radial menu in accordance with embodiments of the present invention. FIG. 5E illustrates a virtual control object 526 with which the user may interact by placing their hand 524 in a particular area denoted by a sphere. The virtual control object 526 may be indicated to be available for interaction by a bracket 528. FIG. 5F illustrates a radial menu being displayed about the virtual control object 526. In the present example, the radial menu includes 4 separate items that may be selected by the user: A 530, B 532, C, 534, and D 536. Each separate item may have a separate virtual control generated for the item. In some embodiments, menu items may be defined in a hierarchical relationship with top level menu controls, such that controls for individual menu items are child virtual controls to the top level menu control. These child controls may be automatically or programmatically generated and/or enabled in response to interaction with the top level menu control.

The items may be disposed radially about the sphere denoting the virtual control object in response to the user placing their hand within in an interactivity area about the sphere. FIG. 5G illustrates a selection process of an item from the radial menu. To select one of the items from the list, the user gestures through the item to be selected. The direction of the gesture with respect to the center of the virtual control object and the displayed selection items thus controls which item is selected. If the first gesture 538 is performed, item A is selected. If the second gesture 540 is performed, item B is selected. If the third gesture 542 is performed, item C is selected, and if the fourth gesture 544 is performed, item D is selected. The user may cancel out of the radial menu by gesturing in a fifth direction 546 not associated with any of the radial menu item virtual controls. An exemplary embodiment of a method for implementing such a control is described further below with respect to FIG. 11.

FIGS. 5H-5K illustrate the use of virtual controls to implement a list selection menu in accordance with embodiments of the present invention. FIG. H illustrates a virtual control object 548 associated with a list control. When the user brings their hand 550 intro proximity with the virtual control object 548, a series of virtual control objects associated with list items may be generated around or about the virtual control object 548. FIG. 5I illustrates a series of list items 552-556. The list item virtual control objects may be generated in a particular direction about the virtual control object 548. For example, the list items virtual control objects 552-556 may be generated vertically above the virtual control object 548 as in the present example, though it should also be appreciated that in other embodiments the list items may be generated horizontally, diagonally, or in various other directions relative to the user, the virtual control object controlling the list, or a combination of the two.

FIG. 5J illustrates a process for selecting a list item. The user has gestured towards a virtual control associated with a particular list item 558. While the user holds the gesture over the list item, a confirmation virtual control object 560 may be displayed. Different confirmation virtual control objects may be associated with each list element, or the same virtual control object may move from list item to list item based on the list item to which the user has gestured. In some embodiments, continued interaction with the list may be contingent on the user maintaining a gesture within an axis along which the list is disposed. For example, in the present example, with a vertically disposed list, if the user gestures outside of the area defined by the left and right boundaries of the list item virtual control objects, the virtual control objects for interacting with the list may disappear until the user interacts with the list virtual control object again. For horizontally disposed lists, if the user gestures outside of the area defined by a top and bottom of list item virtual control objects, the virtual control objects for interacting with the list may similarly disappear.

FIG. 5K illustrates a process for confirming a selection of a list item. To select the list item, the user may interact with the confirmation virtual control object 560. Interaction with the confirmation virtual control object 560 may be performed via particular gesture inputs. For example, some embodiments may require the user to "swipe" through the confirmation virtual control object before the list selection is registered. Other embodiments may confirm the selection in response to the user holding their hand over the confirmation virtual control object 560 for a predefined period of time. An exemplary embodiment of a method for implementing such a control is described further below with respect to FIG. 12.

FIGS. 5L-5O illustrate the use of a "spinner" control that allows the user to perform input using a particular virtual control object until certain criteria associated with that virtual control object are no longer satisfied. FIG. 5L illustrates a virtual control object 564 associated with a spinner control that is activated by a user gesture interaction. FIG. 5M illustrates the result of the user gesture interaction, the creation of a timer display 566. The timer display in this instance is presented as a radial progress meter that gradually fills up with a particular shade of color as the user maintains interaction with the virtual control object 564. For example, in the instant case, the radial progress meter fills in a clockwise direction until the timer display 566 is complete full. If the gesture input is not maintained for the duration of the timer, then the virtual control object may revert back to the state depicted in FIG. 5L.

FIG. 5N illustrates the spinner control after the timer has completely expired and the timer display has completely filled. Upon meeting the timer criteria by maintaining the gesture input, the timer display 566 may be replaced with another virtual control object 568 including one or more particular controls 570 and 572. In the present example, the controls 570 and 572 relate to left and right arrows. The left and right arrows may be interacted with by the user so long as the user maintains a gesture within the virtual control object 568. FIG. 5O illustrates interaction with a particular one of the controls 574, such that the control is activated by user input. Processing associated with the activated control may continue so long as the user maintains interaction with the control. The spinner control may remain in a state allowing interaction with the sub controls so long as the user maintains the gesture input in the larger virtual control object 568. Upon moving their hand outside of an area defined by the virtual control object 568, the controls 570 and 572 may disappear and the user may need to perform the inputs described with respect to FIG. 5M and the timer before using the controls 570 and 572 again. An exemplary embodiment of a method for implementing such a control is described further below with respect to FIG. 13.

Interactions with the virtual control objects may be performed in a variety of manners, and different virtual control objects may be configured to accept different types of interactions. For example, some virtual control objects may be responsive to a "swipe" gesture, where the gesture input passes through and beyond the virtual control object. Other virtual control objects may be responsive to a "hold" gesture, requiring the gesture to be maintained in a particular area or at a particular location for a period of time. Yet further virtual control objects may be responsive to a "twist" gesture, where the user rotates a limb or input device in, near, or around the virtual control object. Other embodiments may require the user to move a portion of their body or an appendage towards the virtual control object for at least a threshold distance. The threshold distance may be dynamically defined based on the user (e.g., based on a user's reach), or static based on the particular control (e.g., within 0.5 meters of the control). Yet further embodiments may also require input from a particular device (e.g., an interface device held in the user's left hand vs. an interface device held in the user's right hand) or portion of the user (e.g., an arm or a leg), such that an interaction is only detected with respect to the virtual control object in response to the interaction being performed using the particular device or portion of the user. Such valid gestures may be defined within the virtual control object configuration data as described above with respect to FIG. 4.

Some virtual control objects may also use particular flags or other criteria for registering interactions other than gesture inputs. For example, such virtual controls may require the user to direct their field of view toward the virtual control object while the gesture is being performed. In such cases, if the user's field of view does not include the virtual control object, the interaction will not be registered. In some embodiments, some virtual control objects may use data other than gesture inputs to adjust or direct functionality of the virtual control object. For example, a virtual control object may use a user's field of view to select a target for an action related to the virtual control (e.g., throwing a ball or firing a weapon), such that the action is performed in the direction of the user's field of view. In such cases, if the user's field of view does not contain an appropriate target, the interaction may not be registered.

Figure 6:
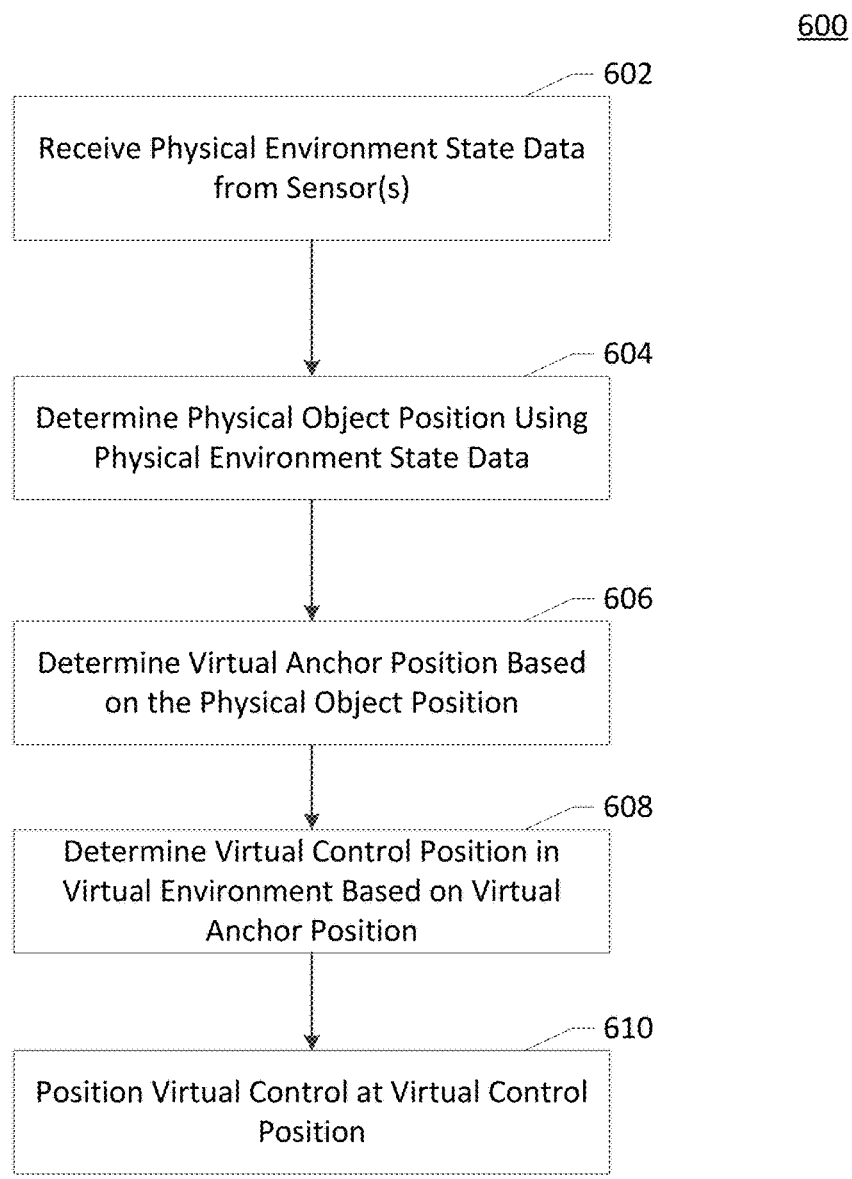
FIG. 6 is a flowchart illustrating an exemplary computer-executable method for positioning a virtual control object for use in a virtual reality system in accordance with exemplary embodiments of the present invention.

Exemplary Computer-Implemented Methods for Providing Gesture Inputs in a Virtual Environment Using Virtual Controls FIG. 6 is a flowchart illustrating an exemplary computer-executable process 600 for positioning a virtual control object for use in a virtual reality system in accordance with exemplary embodiments of the present invention. The method 600 illustrates how embodiments may provide for positioning virtual controls in a flexible, straightforward manner to improve user interaction with a virtual environment. The method 600 functions to determine the physical position of one or more physical objects. The physical positions are used to determine a virtual anchor position, which may be employed as a reference point for placement of virtual controls. Virtual controls are placed relative to the virtual anchor position where they may then be employed by a user to interact with the virtual environment. The method may be performed by a computing device, such as the server 102 or the apparatus 200 described above with respect to FIGS. 1-2, or as part of the data flow described with respect to FIG. 4.

At action 602, the method receives information describing a physical environment state from one or more sensors. As described above with respect to FIGS. 1, 2, and 4, information describing the physical environment may be received directly from the sensors or after raw sensor input is processed to detect object locations. At action 604, the information describing the physical environment state is used to determine the position of one or more physical objects. At action 606, a virtual anchor position is determined based on the one or more physical object positions determined at action 604. An example method for determining a virtual anchor position using a position of a physical object is described further below with respect to FIG. 7.

The virtual anchor position may be utilized as an origin or anchor point based on which the position of virtual controls may be determined. In some embodiments, the virtual anchor position is located at a position in the virtual environment that corresponds to the user's head, the user's chest, or the location of a HMD in a physical environment. In this manner, the virtual anchor position may be dynamically determined based on the particular physical environment and characteristics of the particular user. In some embodiments, characteristics of the virtual anchor position may be configurable. For example, the user may select from an options menu how far in front, above, behind, below, behind, or the like they wish for the virtual anchor position to be located with respect to their position in the physical environment.

At action 608, the positions of one or more virtual controls within the virtual environment are determined based on the virtual anchor position, and at action 610 the virtual control is positioned at the determined virtual control position. For example, the virtual environment state may be updated to reflect the position of the virtual control at that particular location within the virtual environment.

The virtual controls may be placed within the virtual environment so that as the user adjusts the viewing angle of the HMD, the virtual controls are displayed in the HMD when the viewing angle of the HMD corresponds to a physical position that maps to the virtual position of the control. For example, in a typical virtual environment, the display of the HMD is adjusted to display different areas of the virtual environment as the user adjusts the physical viewing angle of the HMD, and those displayed areas of the virtual environment generally correspond to the physical environment around the user. If the user adjusts the angle of the HMD so that, were the user not wearing the HMD, the user would see an area of the physical environment associated with the virtual coordinates of the virtual control, then the virtual control would then be displayed in the display of the HMD. Optionally, the virtual control object may be configured such that it is not displayed even though the area of the virtual environment surrounding the virtual control is displayed to the user. The virtual control object may be displayed only when the viewing angle of the user is such that it is looking at the location in the virtual environment where the virtual control has been located. In this manner, a user may look forward and see through their peripheral vision a virtual environment that contains no virtual control objects. But if the user looks in the direction of a virtual control object, that virtual control object may appear in the environment. As such, embodiments facilitate a mapping between the physical environment and the virtual environment so that as the user interacts with the physical environment (e.g., by performing gestures), the user also interacts with corresponding elements of the virtual environment, thus increasing immersion within the virtual environment and providing increased interactivity with the virtual environment.

Figure 7:
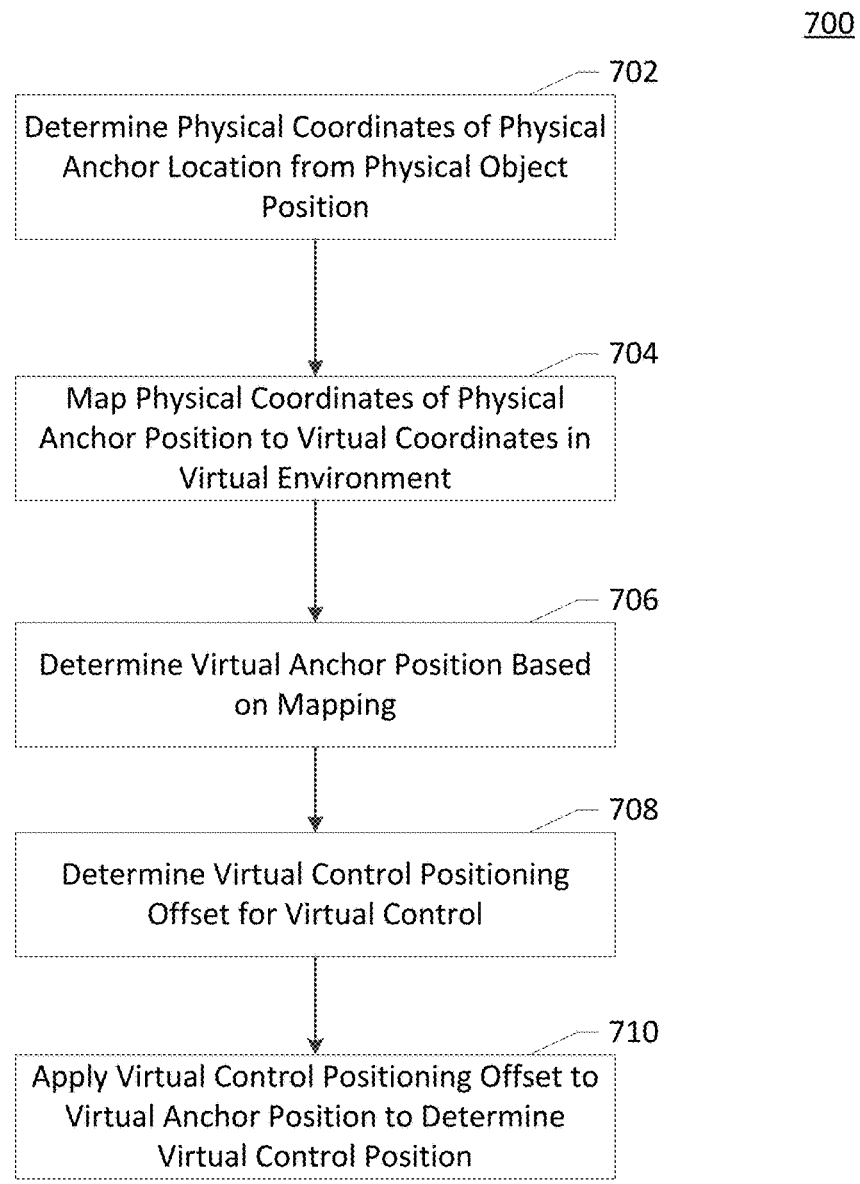
FIG. 7 is a flowchart illustrating an exemplary computer-executable method for determining a position of a virtual control object based on a physical anchor position in accordance with exemplary embodiments of the present invention.

FIG. 7 is a flowchart illustrating an exemplary computer-executable process 700 for determining a position of a virtual control object based on a physical anchor position in accordance with exemplary embodiments of the present invention. As described above with respect to FIG. 6, embodiments may determine a virtual anchor position based on information about a physical environment. FIG. 7 illustrates an example method for determining the virtual anchor position based on detection of certain physical objects.

At action 702, a position of one or more physical objects is known, such as based on a set of physical state data. From the physical object position, the position of a physical anchor may be determined. For example, embodiments may determine the position of physical objects having certain characteristics, such as using infrared beacons on an HMD to determine the location of an HMD. In some embodiments, determination of the physical anchor location is performed in response to certain criteria. For example, accelerometers and gyroscope data provided by the HMD may be used to determine when the HMD has been placed on the user's head (e.g., by detecting when the device is lifted up and then set down level). Upon detection of the HMD being placed on the user's head, a physical anchor location may be determined as part of an initialization or calibration process. In other embodiments, the physical anchor position can be determined through other sensor data. For example, infrared or imaging data may be processed to determine the location of a user's head or hand and the physical anchor position can be set to that location.

At action 704, physical coordinates of the physical anchor position are mapped to virtual coordinates in the virtual environment. At action 706, those virtual coordinates are used as the virtual anchor position. At action 708, a virtual control positioning offset is determined for a virtual control, and at action 710 the position of the virtual control in the virtual environment is determined such that the position of the virtual control in the virtual environment corresponds to the position in the physical environment that the user must perform a gesture input to interact with the virtual control.

Although FIG. 7 generally describes the virtual anchor position as being determined at a single point in time, it should be appreciated that the virtual anchor position may be dynamically adjusted in real-time or at particular intervals. Adjustment of the virtual anchor position in this regard may also cause the positions of virtual controls to update relative to the updated position of the virtual anchor.

Figure 8:
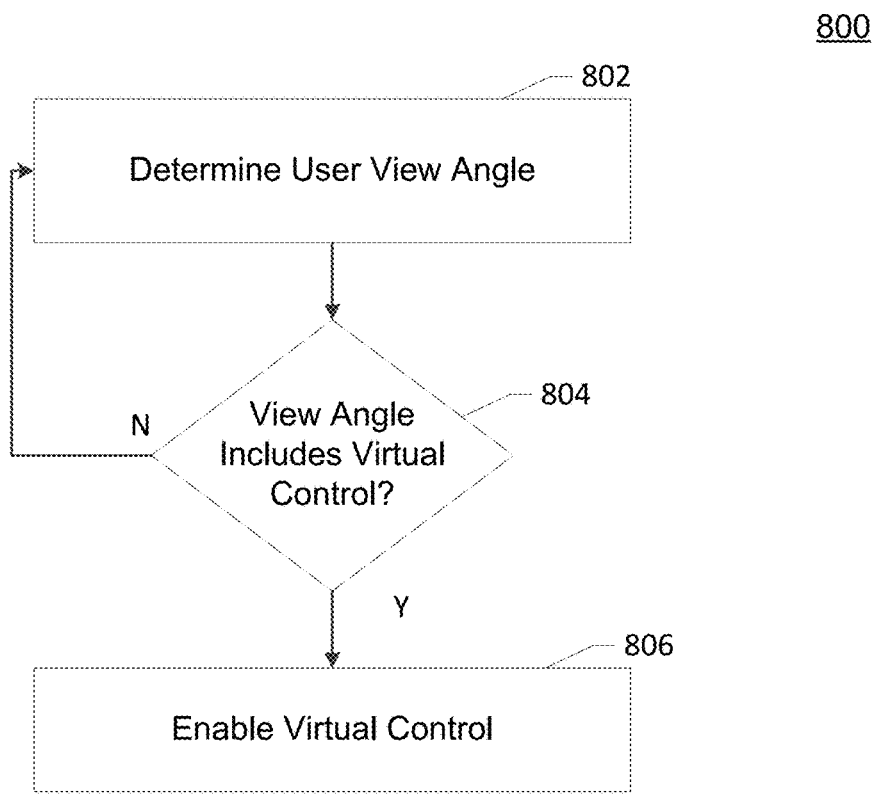
FIG. 8 is a flowchart illustrating an exemplary computer-executable method for enabling a virtual control object based on a viewing angle in accordance with exemplary embodiments of the present invention.

FIG. 8 is a flowchart illustrating an exemplary computer-executable process 800 for enabling a virtual control object based on a viewing angle in accordance with exemplary embodiments of the present invention. As noted above with respect to FIGS. 5A-5O, embodiments may utilize the viewing angle of the user to determine whether to enable or disable, or display, a particular virtual control. In particular, embodiments may enable a virtual control in response to the user's viewing angle being directed toward a position in the physical environment that maps to a position of the virtual control in the virtual environment. In this manner, embodiments ensure that controls may be enabled only after the user is aware of their existence, to avoid inadvertently triggering the virtual control with a gesture when the user has not yet seen the virtual control. It should be appreciated that this feature may be enabled or disabled on a per-control basis in some embodiments. For example, one control might be enabled the entire time, and another control might only be enabled after the user views the control via the HMD. In yet further embodiments, view-based enablement of the virtual controls may be configurable by the user. For example, the first time a user plays a game and is unfamiliar with the controls, he may wish to have each control disabled until viewing, interacting, or receiving a tutorial for the control. A more experienced user who is already aware of the placement and functioning of the controls may wish to disable this feature to immediately have access to all of the available controls.

To perform these functions, at action 802 the method determines the user's view angle. As described above, the user's view angle may be determined by one or more of accelerometers in the HMD, gyroscopes in the HMD, or sensors coupled to a server that detect a position of the user or a portion of the user, such as the user's head or hand, or the particular orientation of a portion of the user. At action 804, a determination is made as to whether the user's view angle includes a virtual control. If the view angle includes a virtual control, that control may be enabled at action 806. Otherwise, the method returns to action 802.

Figure 9:
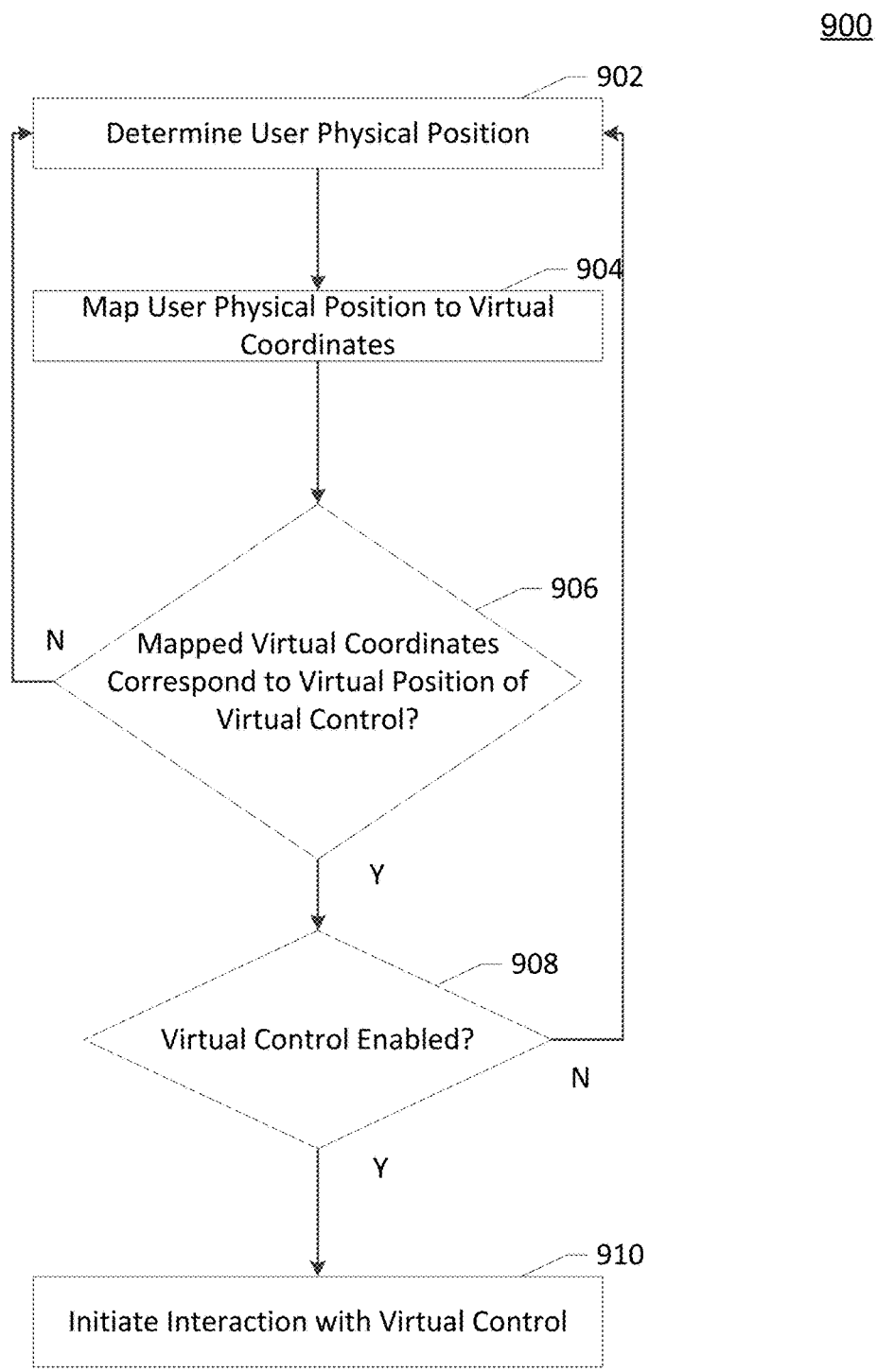
FIG. 9 is a flowchart illustrating an exemplary computer-executable method for interacting with a virtual control object to provide input to virtual reality system in accordance with exemplary embodiments of the present invention.

FIG. 9 is a flowchart illustrating an exemplary computer-executable process 900 for detecting interaction with a virtual control object to provide input to virtual reality system in accordance with exemplary embodiments of the present invention. As noted above, embodiments function by providing a mapping between the physical position of the user and coordinates of a virtual environment. Interaction is detected with virtual controls by determining whether the physical position of the user intersects with a physical position that corresponds to virtual coordinates of virtual controls. The method 900 illustrates an example process by which this interaction may occur.

At action 902, a physical position of a user, portion of a user, or other physical object in the physical environment, is determined, such as from sensor data. For example, a sensor may detect that a user is standing in a particular location, that the user has performed a particular gesture, that the user has moved a particular arm, leg, hand, finger, or the like to a particular point, or the like. The physical location/position of the user may be mapped to a set of virtual coordinates at action 904. It should be appreciated that, while the instant example relates to the position of a user, various additional signals could also be employed. As specific, non-limiting examples, embodiments may detect that the user has performed a particular gesture at the particular location, that the user's view is directed in a particular direction, or the like. Other exemplary signals may include detection of whether the user has crossed a portion of a set of coordinates in the virtual environment, determination of the speed of the gesture, determination of the angle of contact with the virtual control object, detection of an interaction within a defined area of the virtual control object, or the like. For example, embodiments may calculate a speed, direction, angle of contact with a virtual control object, and a contact point on the virtual control object that cause an object in the virtual environment (the virtual control object or another object) to begin to spin based on a force derived from the speed, direction, angle of contact, and contact location. Each of these signals, among others, alone and/or in combination, may be used to evaluate whether and how to evaluate an interaction with a particular virtual control.

At action 906, a determination is made as to whether the virtual coordinates mapped to the physical position of the user correspond to the virtual position of one or more virtual controls. If the user's position (or the position of other physical objects in the physical environment) is not associated with any virtual controls, the method returns to action 902 to continue to track the user. If the user's position is associated with a virtual control, the method proceeds to action 908 to determine whether the control is enabled (e.g., in response to the user previously directing his viewing angle toward the physical area corresponding to the virtual coordinate position of the virtual control). At action 908, if the control is enabled, the method proceeds to action 910 where interaction with the virtual control is initiated. Otherwise, the method returns to action 902 to continue to monitor the user's position.

Figure 10:
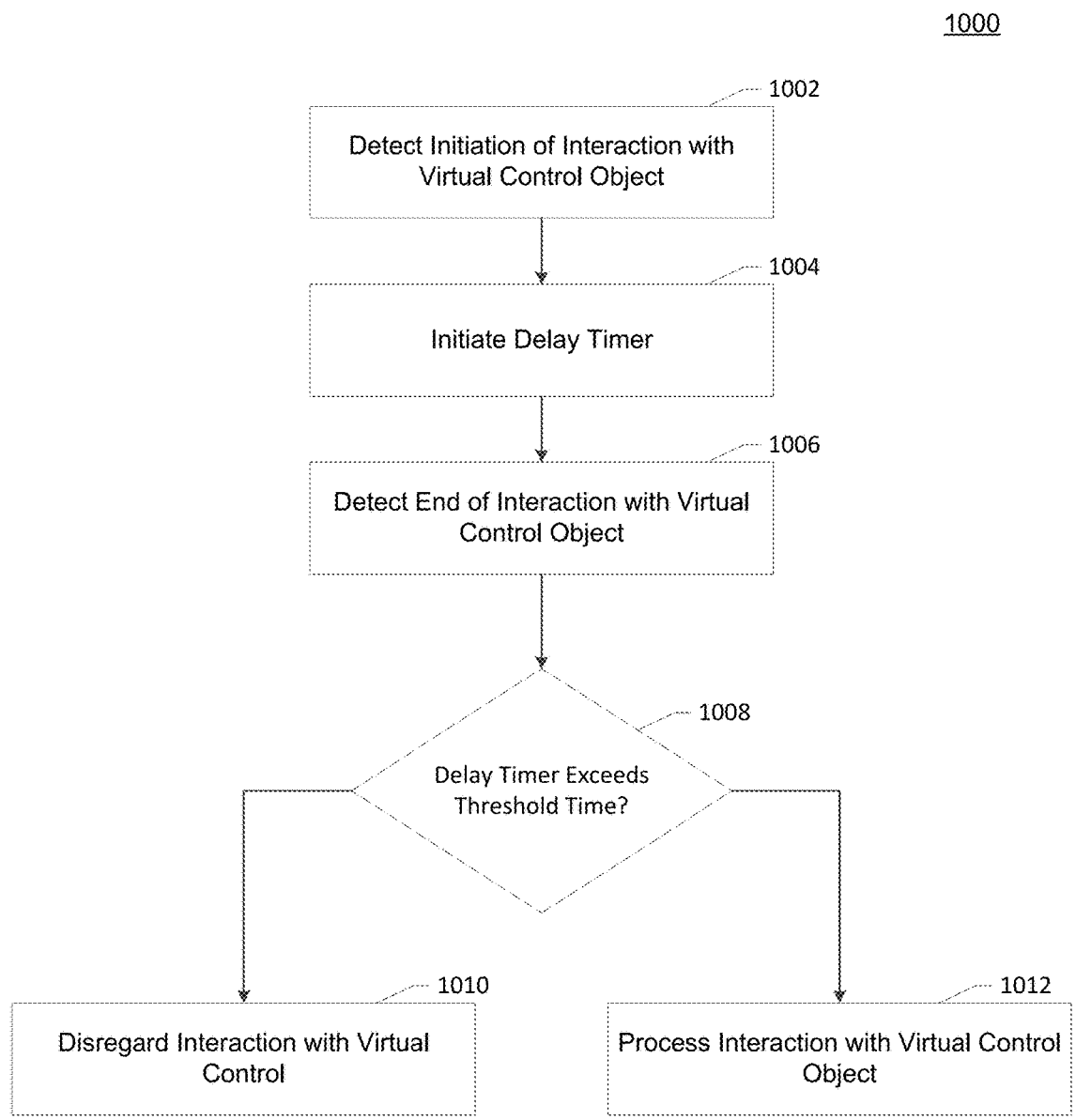
FIG. 10 is a flowchart illustrating an exemplary computer-executable method for using a delay to improve interaction with a virtual control object to provide input to a virtual reality system in accordance with exemplary embodiments of the present invention.

FIG. 10 is a flowchart illustrating an exemplary computer-executable process 1000 for using a delay to improve interaction with a virtual control object to provide input to a virtual reality system in accordance with exemplary embodiments of the present invention. In order to reduce inadvertent inputs to virtual controls, the inventors have determined that some embodiments may benefit from employing a delay before performing functionality related to interaction with a particular virtual control. In this manner, embodiments may require the user to hold their hand or other input gesture over a virtual control for a particular period of time before enabling input via that virtual control.

At action 1002, the method 1000 may detect that a user has interacted with a virtual control. For example, as described above, the user may have placed their hand or another part of their body on or near a virtual control that is enabled. At action 1004, prior to performing the function associated with the virtual control, embodiments may begin a delay timer. At action 1006, the end of the user interaction may be detected. If the interaction lasted longer than the delay timer, then the functionality associated with the virtual control may be performed at action 1012. If the interaction lasted less than the delay timer, then the interaction may be disregarded at action 1010 and the control not performed.

In other embodiments, the delay timer may be associated with intent to initiate interaction rather than an entire gesture. For example, the user may be required to point or more their arm toward a virtual control for at least a threshold period of time before that control accepts user gesture input. As such, the timer may be associated with the initial interaction, rather than the entire gesture input.

Figure 11:
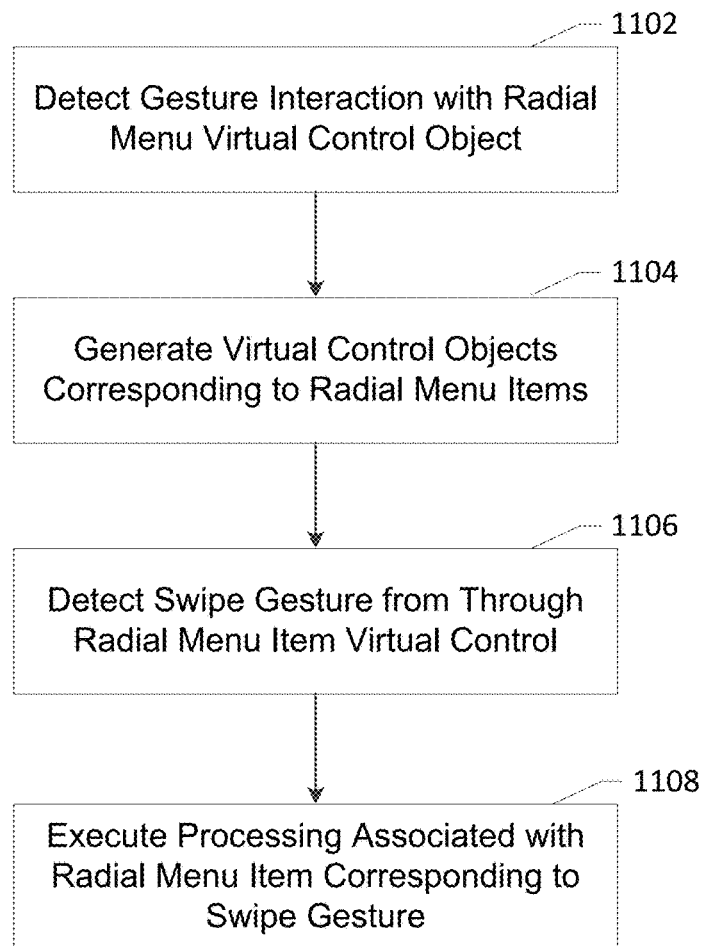
FIG. 11 is a flowchart illustrating an exemplary computer-executable method for interacting with a virtual control object implementing a radial menu interface in accordance with exemplary embodiments of the present invention.

FIG. 11 is a flowchart illustrating an exemplary computer-executable process 1100 for performing gesture inputs using virtual control objects to implement a radial selection menu in accordance with exemplary embodiments of the present invention. In order to improve interaction with virtual objects, reduce errant inputs, and otherwise improve the technology by which users interact with a virtual environment, the inventors have developed various input techniques and modalities using virtual control objects to enhance the process by which inputs are received. One such novel development is a radial menu implemented using virtual control objects. The process 1100 describes the manner in which users may interact with said radial menu virtual control object.

At action 1102, a gesture interaction with a radial menu virtual control object is detected. For example, the user may gesture within a particular area defined around the radial menu virtual control object. As noted above, different gestures performed with respect to the virtual control object may produce different results. At action 1104, upon detecting the gesture interaction with the radial menu virtual control object, a series of virtual control objects corresponding to elements of the radial menu may generated radially about the radial menu virtual control object. At action 1106, a swipe gesture may be detected through an element of the radial menu. In some embodiments, the swipe gesture must originate within a certain proximity to the radial menu virtual control object since the radial menu may disappear if the user gestures outside of the radial menu virtual control object. At action 1108, processing associated with the radial menu item corresponding to the swipe gesture is executed.

Figure 12:
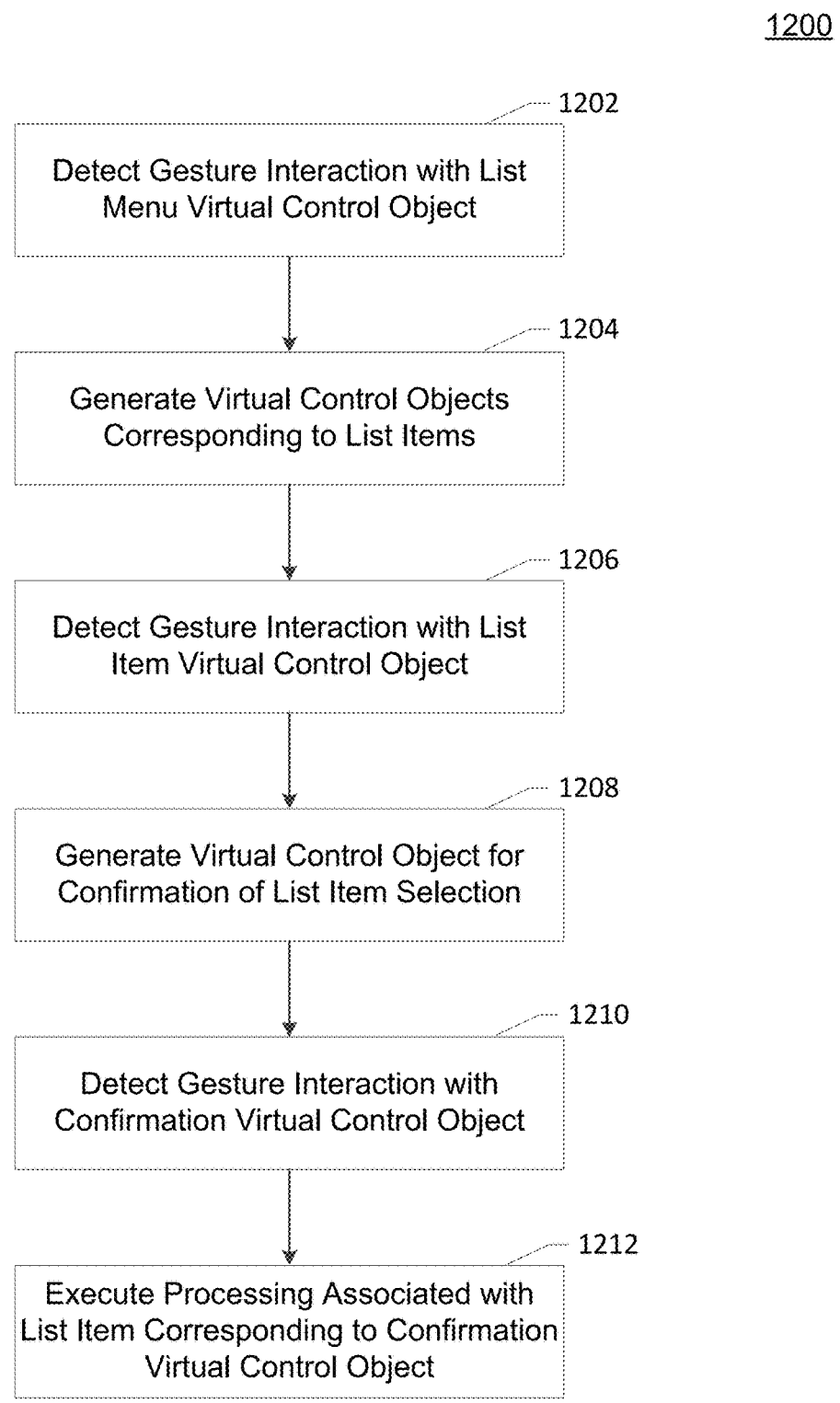
FIG. 12 is a flowchart illustrating an exemplary computer-executable method for interacting with a virtual control object implementing a list confirmation interface in accordance with exemplary embodiments of the present invention.

FIG. 12 is a flowchart illustrating an exemplary computer-executable process 1200 for performing gesture inputs using a list menu in accordance with exemplary embodiments of the present invention. As with the radial menu virtual control object, the inventors have developed a list control object that advantageously provides for reduced input error and more precise selection of items within a virtual control object. The process 1200 describes the manner in which users may interact with said list virtual control object.

At action 1202, a gesture interaction is detected with respect to a list virtual control object. At action 1204, in response to the interaction with the list virtual control object, a series of virtual control objects corresponding to items of the list are generated. These list item virtual control objects may be generated expanding out from the list virtual control object in a particular direction or along a particular axis, such as vertically above the list virtual control object.

At action 1206, a gesture interaction with one of the list item virtual control objects is detected. As described above with respect to FIGS. 5H-5K, interaction with a list item virtual control object may require the user maintain a gesture input within a particular area associated with the list, such as within a vertical or horizontal range defined by the axis along which the list extends.

At action 1208, a confirmation virtual control object is generated corresponding to the list item selected at action 1206. The confirmation virtual control object may be disposed adjacent to the virtual control object corresponding to the selected list item. In some embodiments, the confirmation virtual control object moves up and down the list to be adjacent to different list item virtual control objects as the user gestures towards the different list item virtual control objects. In other embodiments, a separate confirmation virtual control object is generated for each list item upon selection of the list item. In yet further embodiments, each list item virtual control object is associated with a separate confirmation virtual control object, and the confirmation virtual control object is enabled and disabled as the user gestures towards each list item virtual control object. Enabling and disabling of the virtual control object may include making enabled confirmation virtual control objects visible to the user and making disabled confirmation virtual control objects invisible.

At action 1210, a gesture interaction is detected with the confirmation virtual control object. The confirmation virtual control object may require a particular type of gesture input to for interaction. For example, the confirmation virtual control object may require a "swipe" gesture to be performed through the confirmation virtual control object from the list item virtual control object. In other embodiments, other gesture interactions may be performed to interact with the confirmation virtual control object, including but not limited to holding a gesture over the confirmation virtual control object, gesturing "through" the confirmation virtual control object as if the user was pressing a button, "flicking" the list item virtual control object at the confirmation virtual control object, or the like.

At action 1212, upon detecting the gesture interaction with the confirmation virtual control object, processing is executed associated with the list item corresponding to the selected list item virtual control object.

Figure 13:
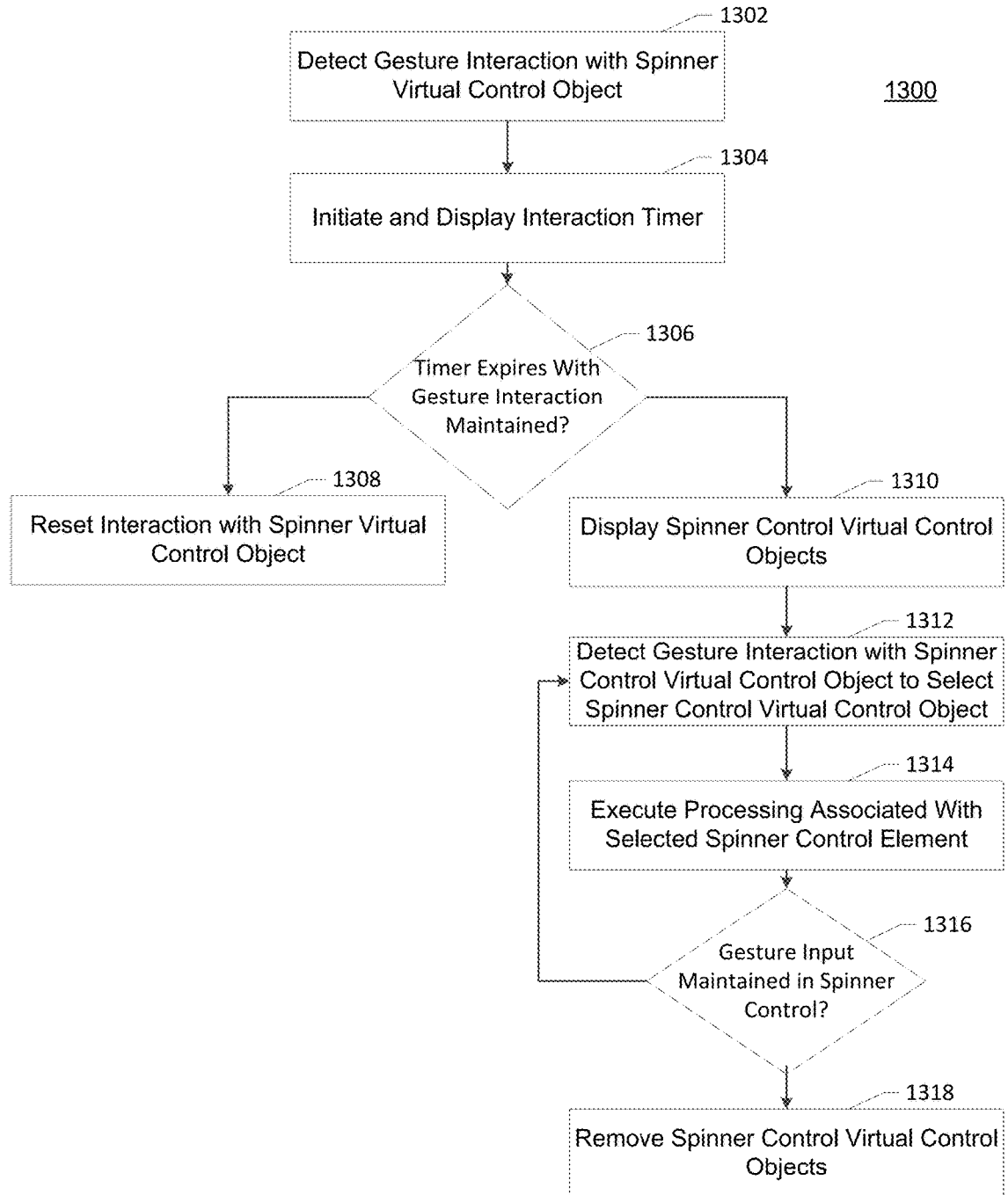
FIG. 13 is a flowchart illustrating an exemplary computer-executable method for interacting with a virtual control object implementing a spinner interface in accordance with exemplary embodiments of the present invention.

FIG. 13 is a flowchart illustrating an exemplary computer-executable process 1200 for performing gesture inputs using a spinner control in accordance with exemplary embodiments of the present invention. As with the radial menu virtual control object and the list virtual control object described above, the inventors have developed a spinner virtual control object that advantageously provides for reduced input error and more precise selection of items within a virtual control object. The process 1300 describes the manner in which users may interact with said spinner virtual control object.

At action 1302, an initiation of interaction with a spinner virtual control object is detected. At action 1204, a timer is initiated and a timer display associated with the spinner virtual control object is generated within the virtual environment. As noted above with respect to FIG. 5M, the timer may be displayed radially about the spinner virtual control object. At action 1306, a determination is made as to whether the gesture interaction is maintained for the duration of the timer. If the gesture is not maintained until the timer expires, the process proceeds to action 1308 where interaction with the spinner virtual control object is reset. Otherwise, the process proceeds to action 1310.

At action 1310, if the gesture input is maintained for the duration of the timer, one or more spinner control virtual control objects may be displayed. These spinner control virtual control objects may be displayed within an area defined within or around the spinner virtual control object, such as described above with respect to FIG. 5N. At action 1312, a gesture interaction is detected with one or more of the spinner control virtual control objects to select a particular spinner control virtual control object. At action 1314, processing associated with the selected spinner control virtual control object is executed. At action 1316, if a gesture input is no longer maintained within the spinner control, the spinner control virtual control objects are removed at action 1318 and the spinner control resets to its original state. Otherwise, the process returns to action 1312 to detect additional gesture input via the spinner control virtual control objects.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by ½0th, ⅒th, ⅕th, ⅓rd, ½nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions. Exemplary systems may include more or fewer modules than those illustrated in the exemplary block diagrams.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for implementing a virtual control in a virtual reality environment, the method comprising:
   receiving data indicating a physical environment state;
   processing, by a processor, the data indicating the physical environment state to determine a physical position of at least one user;
   determining, by the processor and based on the position of the at least one user, at least one physical anchor position within the physical environment state;
   mapping, by virtual environment state management circuitry, the physical anchor position to a virtual anchor position within a virtual environment state, wherein the virtual environment state includes a plurality of virtual coordinate positions that map to at least a portion of the physical environment state;
   predefining, by the virtual environment state management circuitry, a fixed virtual coordinate position for at least one virtual control from the plurality of virtual coordinate positions by:
      identifying a virtual control positioning offset indicating a relative position with respect to the virtual anchor position; and
      applying the virtual control positioning offset to the virtual anchor position to determine the fixed virtual coordinate position, wherein a first relative position between the fixed virtual coordinate position and the virtual anchor position corresponds to a second relative position between a particular physical coordinate position mapped to the fixed virtual coordinate position and the physical anchor position;
   determining a view angle of the at least one user; and
   only in response to determining that the view angle of the at least one user includes an area of a physical environment encompassing the fixed virtual coordinate position predefined by the virtual environment state management circuitry, instructing a display device configured to display the virtual environment state to display the virtual control at the fixed virtual coordinate position.

2. The method of claim 1, further comprising:
   determining that the physical position of at least a portion of the user is within a defined area of a physical environment corresponding to the physical environment state that maps to the fixed virtual coordinate position; and in response to mapping the physical position of the at least one the user to the fixed virtual coordinate position, executing functionality associated with the virtual control.

3. The method of claim 2, further comprising executing the functionality associated with the virtual control only in response to determining that the physical position of the at least one user has been proximate to the physical position that maps to the fixed virtual coordinate position for at least a threshold period of time.

4. The method of claim 1, wherein the physical position of the at least one user is the user's head or shoulders.

5. The method of claim 1, wherein the virtual control is associated with one or more particular gestures, and wherein functionality of the virtual control is only executed in response to performing at least one of the one or more gestures at a physical position that maps to a defined area around the fixed virtual coordinate position.

6. The method of claim 1, wherein the data indicating the physical environment state is received from at least one sensor and wherein the at least one sensor is at least one of a camera or an infrared receiver.

7. The method of claim 1, wherein the display device is a head-mounted display.

8. The method of claim 7, wherein the physical anchor position is determined at least in part by detecting an infrared emitter mounted on the head-mounted display.

9. The method of claim 1, further comprising:
determining a view angle of the at least one user; and
enabling interaction with the virtual control in response to determining that the view angle corresponds to an area of a physical environment corresponding to the fixed virtual coordinate position of the virtual control object.

10. The method of claim 9, wherein the view angle of the user is determined based at least in part on a sensor reading received from a head-mounted device.

11. The method of claim 1, wherein determining the physical anchor position is performed in response to at least one of turning on the display device or placing the display device on the user's head.

12. The method of claim 1, wherein a component value of the virtual control positioning offset is determined based at least in part on a number of initialized virtual controls, or a detected height of the user.

13. A computer-implemented method for implementing a virtual control in a virtual reality environment, the method comprising:
receiving data indicating a physical environment state;
processing, by a processor, the data indicating the physical environment state to determine a physical position of a physical object;
determining, by the processor, based on the physical position of the physical object, at least one virtual anchor position within a virtual environment state;
predefining, by virtual environment state management circuitry, a fixed virtual coordinate position of a virtual control in the virtual environment state relative to the virtual anchor position;
mapping, by the virtual environment state management circuitry, the fixed virtual coordinate position to a physical position of the control in a physical environment corresponding to the physical environment state;
determining, by the virtual environment state management circuitry, a view angle of at least one user; and
only in response to determining that the view angle includes an area of a physical environment encompassing the fixed virtual coordinate position predefined by the virtual environment state management circuitry, instructing a display device configured to display the virtual environment state to display the virtual environment state such that the virtual control is displayed at the fixed virtual coordinate position.

14. The method of claim 13, further comprising determining that a view angle of the display device is angled toward the physical position prior to displaying the virtual control via the display device.

15. The method of claim 13, further comprising:
determining that the physical position of the physical object is within a defined area of a physical environment corresponding to the physical environment state that maps to the fixed virtual coordinate position; and
in response to determining that the physical position of the user is proximate to the physical position of the control, executing functionality associated with the virtual control.

16. The method of claim 15, further comprising executing the functionality associated with the virtual control only in response to determining that the physical position of physical object has been proximate to the physical position of the control for at least a threshold period of time.

17. The method of claim 13, wherein the virtual anchor position is associated with a physical position of a user's head.

18. The method of claim 13, wherein the data indicating the physical environment state is received from at least one sensor and wherein the at least one sensor is at least one of a camera or an infrared receiver.

19. The method of claim 13, wherein the display device is a head-mounted display.

20. The method of claim 13, wherein determining the virtual anchor position is performed in response to at least one of turning on the display device or placing the display device on the user's head.

21. A non-transitory computer-readable storage medium comprising instructions, that, when executed by a processor, cause the processor to implement a virtual control in a virtual reality environment, by at least:
receiving data indicating a physical environment state;
processing, by a processor, the data indicating the physical environment state to determine a physical position of a physical object;
determining, by the processor, based on the physical position of the physical object, at least one virtual anchor position within a virtual environment state;
predefining, by virtual environment state management circuitry, a fixed virtual coordinate position of a virtual control in the virtual environment state relative to the virtual anchor position;
mapping, by the virtual environment state management circuitry, the fixed virtual coordinate position to a physical position of the control in a physical environment corresponding to the physical environment state;
determining, by the virtual environment state management circuitry, a view angle of at least one user; and
only in response to determining that the view angle includes an area of a physical environment encompassing the fixed virtual coordinate position predefined by the virtual environment state management circuitry, instructing a display device configured to display the virtual environment state to display the virtual environment state such that the virtual control is displayed at the fixed virtual coordinate position.

22. A system for providing a virtual reality environment, the system comprising:

circuitry configured to output a virtual environment state provided by virtual environment state management circuitry to at least one display device, the virtual environment state including one or more virtual controls, wherein the virtual environment state comprises a virtual coordinate system for indicating locations of virtual objects within the virtual environment state;

circuitry configured to receive data indicating a physical environment state from at least one sensor, wherein the physical environment state comprises a physical coordinate system for indicating locations of physical objects within the physical environment state;

physical environment state management circuitry configured to determine a physical anchor position at a particular physical coordinate position within the physical coordinate system using the data indicating the physical environment state; and the virtual environment state management circuitry configured to:

generate a mapping between a set of virtual coordinate positions and a set of physical coordinate positions;

determine, based on the mapping, a particular virtual coordinate position corresponding to the particular physical coordinate position;

place a virtual control anchor at the particular virtual coordinate position;

determine fixed virtual coordinate positions for the one or more virtual controls according to respective virtual control positioning offsets by applying the virtual control positioning offset to the particular virtual coordinate position of the virtual control anchor;

determine a view angle of at least one user; and only in response to determining that the view angle corresponds to an area of a physical environment corresponding to a subset of the fixed virtual coordinate positions of the one or more virtual controls, place the respective one or more virtual controls within the virtual environment state at the corresponding fixed virtual coordinate positions.

23. The system of claim 22, wherein the display device is a head-mounted display.

24. The system of claim 22, wherein the virtual environment state management circuitry is further configured to display only a portion of the virtual environment state via the display device, and wherein the portion of the virtual environment state is determined based on a view angle of the display device.

25. The system of claim 22, wherein the physical environment state management circuitry is further configured to determine a user position, and wherein the virtual environment state management circuitry is further configured to:

determine that the user position is proximate to at least one physical coordinate position that maps to a particular fixed virtual coordinate position; and perform a function associated with the corresponding virtual control in response to determining that the user position is proximate to at least one physical coordinate position that maps to the particular fixed virtual coordinate position.

* * * * *